United States Patent
Yilmaz et al.

(10) Patent No.: US 10,939,366 B2
(45) Date of Patent: Mar. 2, 2021

(54) USER EQUIPMENT AND METHOD IN A WIRELESS COMMUNICATIONS NETWORK

(71) Applicant: Telefonaktiebolaget LM Ericsson (publ), Stockholm (SE)

(72) Inventors: Osman Nuri Can Yilmaz, Espoo (FI); Lian Araujo, Solna (SE); Patrik Rugeland, Stockholm (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/338,581

(22) PCT Filed: Feb. 13, 2019

(86) PCT No.: PCT/SE2019/050121
§ 371 (c)(1),
(2) Date: Apr. 1, 2019

(87) PCT Pub. No.: WO2020/167169
PCT Pub. Date: Aug. 20, 2020

(65) Prior Publication Data
US 2020/0267631 A1    Aug. 20, 2020

(51) Int. Cl.
*H04W 48/16*    (2009.01)
*H04W 48/08*    (2009.01)

(52) U.S. Cl.
CPC ........... *H04W 48/16* (2013.01); *H04W 48/08* (2013.01)

(58) Field of Classification Search
CPC ............ H04W 72/413; H04W 72/042; H04W 72/04; H04W 72/046; H04W 74/06;
(Continued)

(56) References Cited

U.S. PATENT DOCUMENTS

2012/0250578 A1*  10/2012  Pani ............... H04W 48/12
                                                    370/254
2013/0250902 A1*  9/2013   Xu ................ H04W 74/006
                                                    370/329
(Continued)

FOREIGN PATENT DOCUMENTS

EP    3413625 A1    12/2018
WO    2016021821 A1   2/2016

OTHER PUBLICATIONS

"3GPP TS 37.340 V15.4.0", 3rd Generation Partnership Project; Technical Specification Group Radio Access Network; Evolved Universal Terrestrial Radio Access (E-UTRA) and NR; Multi-connectivity; Stage 2 (Release 15), Dec. 2018, pp. 1-67.

(Continued)

*Primary Examiner* — Jean A Gelin
(74) *Attorney, Agent, or Firm* — Murphy, Bilak & Homiller, PLLC

(57) ABSTRACT

A method performed by a User Equipment (UE) for handling multiple Secondary Cell Group (SCG) configurations in a wireless communications network is provided.
The UE receives (1201) from a network node:
a first SCG configuration of a first Secondary Node, SN, and an indication of whether or not the first SCG is to be configured as active or inactive, and
a second SCG configuration of a second SN, and an indication of whether or not the second SCG is to be configured as active or inactive. The multiple SCG configurations comprises at least the first SCG configuration and the second SCG configuration.
The UE then decides (1202) whether to handle each respective SCG configuration out of the multiple SCG configurations according to a first option or a second option based on its respective indication.

(Continued)

The first option comprises when one or more out of the respective multiple SCG configurations are indicated to be configured as inactive, storing (1203) that particular SCG configuration.

The second option comprises when one or more out of the respective multiple SCG configurations are indicated to be configured as active, activating (1204) that particular SCG configuration in the UE.

13 Claims, 23 Drawing Sheets

(58) Field of Classification Search
 CPC ........... H04W 74/0833; H04W 74/006; H04W 76/15; H04W 76/16; H04W 76/19; H04W 76/27; H04W 48/08; H04W 48/16; H04W 48/20; H04W 36/0069
 See application file for complete search history.

(56) References Cited

U.S. PATENT DOCUMENTS

| | | | | |
|---|---|---|---|---|
| 2014/0198762 A1* | 7/2014 | Yang | ..................... | H04L 5/0037 370/329 |
| 2014/0286240 A1* | 9/2014 | Kim | ..................... | H04W 76/28 370/328 |
| 2015/0215826 A1* | 7/2015 | Yamada | ............ | H04W 36/0072 455/436 |
| 2015/0223220 A1* | 8/2015 | Zhao | ................... | H04W 76/046 455/450 |
| 2015/0334603 A1* | 11/2015 | Uchino | ................. | H04L 5/0057 370/331 |
| 2016/0029387 A1* | 1/2016 | Uemura | ................ | H04W 16/32 370/329 |
| 2016/0056936 A1* | 2/2016 | Sun | ..................... | H04L 27/2692 370/329 |
| 2017/0150405 A1* | 5/2017 | Chiba | ................... | H04L 63/068 |
| 2017/0164281 A1* | 6/2017 | Chiba | .............. | H04W 72/0446 |
| 2017/0347270 A1* | 11/2017 | Iouchi | .............. | H04W 72/0406 |
| 2018/0295670 A1* | 10/2018 | Decarreau | ............ | H04W 76/38 |
| 2018/0359800 A1* | 12/2018 | Wu | ...................... | H04J 11/0076 |
| 2019/0037498 A1* | 1/2019 | Tseng | ................... | H04W 76/19 |
| 2019/0037635 A1* | 1/2019 | Guo | ........................ | H04W 76/27 |
| 2019/0159051 A1* | 5/2019 | Takahashi | ............. | H04W 72/04 |
| 2019/0182881 A1* | 6/2019 | Teyeb | ..................... | H04L 5/001 |
| 2019/0387561 A1* | 12/2019 | Paladugu | .............. | H04W 76/15 |
| 2020/0120553 A1* | 4/2020 | Wang | ..................... | H04W 76/18 |
| 2020/0120735 A1* | 4/2020 | Wang | ........................ | H04L 5/00 |
| 2020/0145083 A1* | 5/2020 | John Wilson | ......... | H04W 88/06 |
| 2020/0163140 A1* | 5/2020 | Mochizuki | ............ | H04W 16/32 |

OTHER PUBLICATIONS

"3GPP TS 36.331 V15.3.0", Radio Access Network; Evolved Universal Terrestrial Radio Access (E-UTRA); Radio Resource Control (RRC); Protocol specification (Release 15), Sep. 2018, pp. 1-770.

"Description of EN-DC procedures", 3GPP TSG-RAN WG3 Meeting #96; R3-171469; Hangzhou, P.R. China, May 15-17, 2017, pp. 1-14.

"Multiple inactive SCG configurations", 3GPP TSG-RAN WG2 #107; Tdoc R2-1910265; Prague, Czech Republic, Aug. 26-30, 2019, pp. 1-3.

* cited by examiner

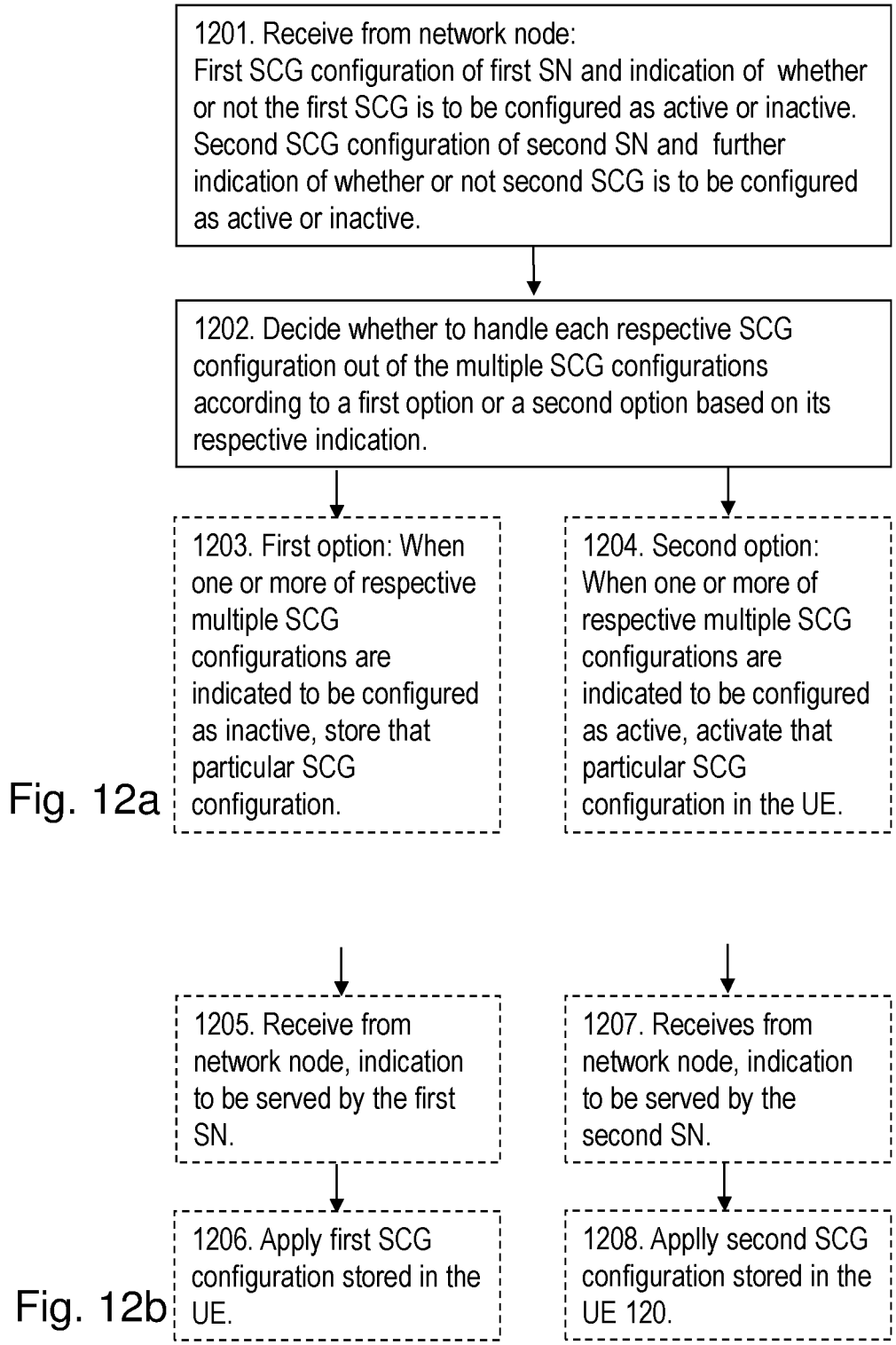

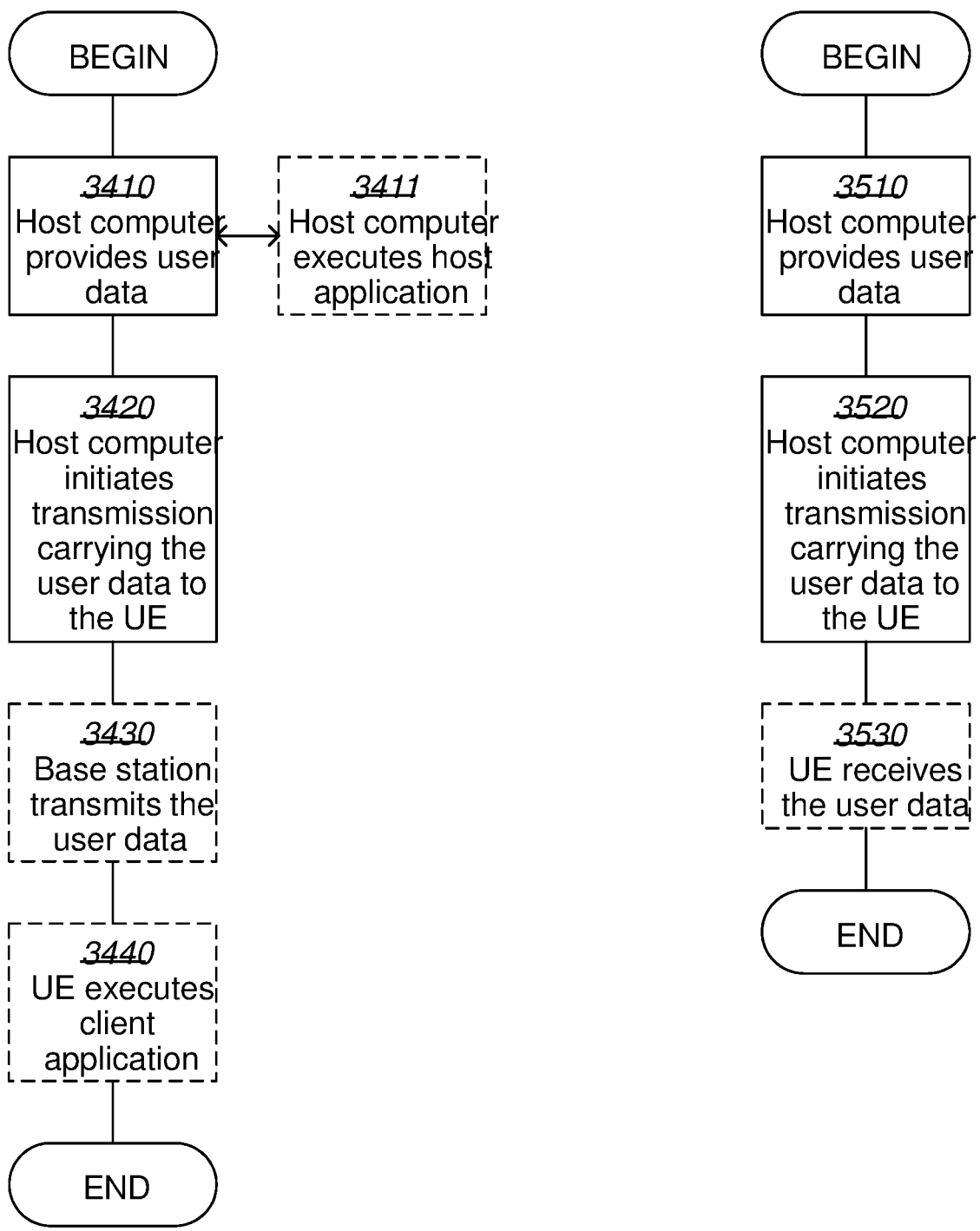

USER EQUIPMENT AND METHOD IN A WIRELESS COMMUNICATIONS NETWORK

TECHNICAL FIELD

Embodiments herein relate to a User Equipment (UE) and a method therein. In some aspects, they relate to handling multiple Secondary Cell Group (SCG) configurations in a wireless communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In 3GPP Dual-Connectivity (DC) solution has been specified, both for LTE and NR, as well as between LTE and NR. In DC two nodes are involved, a Master Node (MN) and a Secondary Node (SN). Multi-Connectivity (MC) is a case when there are more than two nodes involved. DC may also be used in Ultra Reliable Low Latency Communications (URLLC) cases in order to enhance the robustness and to avoid connection interruptions.

Inter-RAT and Inter 5GC in Interworking LTE and NR 5G in 3GPP introduces both a new core network (5GC) and a New Radio access network (NR). The 5GC will however, also support other RATs than NR. It has been agreed that LTE, here also referred to as E-UTRA, also will be connected to 5GC. LTE base stations referred to as eNBs, that are connected to 5GC are referred to as new generation-eNB (ng-eNBs) and is part of NG-RAN which also comprises NR base stations called gNBs. FIG. 1 depicts a 5G System (5GS) architecture comprising 5GC and NG-RAN. It shows how the base stations are connected to each other and the nodes in 5GC. The interface between the base stations are referred to as Xn. The interface between the base stations and core network nodes such as Access and Mobility Function/User Plane Function (AMF/UPF) nodes and the core network are referred to as NG.

Currently in an LTE (E-UTRA) connected to the 5GC and NR state transitions are supported, see FIG. 2. FIG. 2 depicts UE state machine and state transitions between NR/5GC, E-UTRA/EPC and E-UTRA/5GC.

As can be seen it is possible to move an ongoing UE connection wherein the UE is in RRC_CONNECTED state, between the two RATs using handover procedure. Additionally (not shown) it is possible for the network to move the UE to the other RAT by sending a Release message with re-direct information. When the UE is in RRC-IDLE or RRC-INACTIVE state the cell reselection procedure will be used when transiting between the RATs. Within the RATs there is also an RRC Re-establishment procedure which may be triggered if the UE loses the radio connection, referred to as Radio Link Failure, or at intra or inter-RAT handover failure.

In NR and E-UTRA, i.e. LTE connected to 5GC, a new RRC state called RRC_INACTIVE has been introduced. When used herein, NG-RAN refers to either NR or LTE connected to 5G Core (5GC) network.

In RRC_INACTIVE, the UE stores certain configurations, e.g. Data Radio Bearer (DRB) configurations and physical layers parameters. When the UE need to resume the connection, it transmits an RRCConnectionResumeRequest or RRCResumeRequest message in LTE and NR respectively. The UE may then reuse the stored settings and reduce the time and signaling needed to enter RRC_CONNECTED.

LTE and NR/EPS and 5GS

There are different ways to deploy 5G network with or without interworking with LTE and EPC, which is referred to as different options. In principle, NR and LTE may be deployed without any interworking, denoted by NR Stand-Alone (SA) operation, that is gNB in NR may be connected to 5GC (Option 2) and eNB may be connected to EPC (Option 1) with no interconnection between the two.

On the other hand, the first supported version of NR is the so-called E-UTRAN-NR Dual Connectivity (EN-DC), (Option 3). In Option 3, a deployment, dual connectivity between NR and LTE is applied with LTE as a master node and NR as a secondary node. The RAN node (gNB) supporting NR, may not have a control plane connection to EPC, instead it relies on the LTE as Master node (MeNB). This is also referred to as Non-standalone NR. It should be noted that that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, option 2 supports stand-alone NR deployment where gNB is connected to 5GC. Similarly, LTE may also be connected to 5GC using eLTE, E-UTRA/5GC, or LTE/5GC and the node may be referred to as an ng-eNB (Option 5). eLTE means that LTE is connected to 5GC. In these cases, both NR and LTE are seen as part of the NG-RAN (and both the ng-eNB and the gNB can be referred to as NG-RAN nodes).

It is worth noting that, Option 4 and Option 7 are other variants of dual connectivity between LTE and NR which will be standardized as part of NG-RAN connected to 5GC, denoted by MR-DC (Multi-Radio Dual Connectivity). The following is comprised under the MR-DC umbrella:

EN-DC (Option 3): LTE is the master node and NR is the secondary (EPC CN employed)
NE-DC (Option 4): NR is the master node and LTE is the secondary (5GCN employed)
NGEN-DC (Option 7): LTE is the master node and NR is the secondary (5GCN employed)
NR-DC (variant of Option 2): Dual connectivity where both the master and secondary are NR (5GCN employed).

As the migration for these options may differ from different operators, it is possible to have deployments with multiple options in parallel in the same network e.g. there may be an eNB base station supporting option 3, 5 and 7 in the same network as an NR base station supporting option 2 and 4. In combination with dual connectivity solutions between LTE and NR it is also possible to support Carrier Aggregation (CA) in each cell group, i.e. Master Cell Group (MCG) and Secondary Cell Group (SCG), and dual connectivity between nodes on same RAT, e.g. NR-NR DC. For the LTE cells, a consequence of these different deployments is the co-existence of LTE cells associated to eNBs connected to EPC, 5GC or both EPC/5GC.

Background RRC Connection Resume in LTE

In 3GPP LTE Release-13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits:
Reduce latency e.g. for smart phones accessing Internet.
Reduced signaling leads to reduce battery consumption for machine type devices sending very little data.

The Release-13 solution is based on that the UE sends a RRCConnectionResumeRequest message to the network and in response may receive an RRCConnectionResume message from the network. The RRCConnectionResume message is not encrypted but integrity protected.

The resume procedure in LTE may be found in the 3GPP RRC specifications TS 36.331. As the UE performing resume is in RRC_IDLE (with suspended AS context), that triggers a transition from RRC_IDLE to RRC_CONNECTED. Hence, that is modelled in the specifications in the same subclause that captures the RRC connection establishment (subclause 5.3.3 RRC connection establishment).

Background RRC Connection Resume in NR and eLTE

The RRC state model is updated in NR and in eLTE, i.e. LTE connected to 5GC, and a new RRC_INACTIVE state is introduced in addition to the existing RRC_IDLE and RRC_CONNECTED states inherited from LTE. In RRC_INACTIVE, the UE context from a previous RRC connection is stored in the RAN and is re-used the next time an RRC connection is established. The UE context includes information such as the UE security configuration, configured radio bearers etc. By storing the UE context in the RAN, the signaling required for security activation and bearer establishment is avoided, which is normally required when transitioning from RRC_IDLE to RRC_CONNECTED. This improves latency and reduces the signaling overhead.

A UE state machine and state transitions in NR is depicted in FIG. 3.

The NR RRC_INACTIVE mode is realized by introducing two new procedures RRC connection suspend, also called RRC connection release with Suspended Configuration (SuspendConfig) and "RRC connection resume. See FIG. 4. The gNB suspends a connection with UL and DL data transmissions and moves the UE from NR RRC_CONNECTED to NR RRC_INACTIVE by sending an RRCRelease message with suspend indication or configuration to the UE. This may happen for example after the UE has been inactive for a certain period which causes the gNB internal inactivity timer to expire. Both the UE and the gNB stores the UE context and the associated identifier, referred to as I-RNTI. It has been recently updated that two identifiers will be configured in the suspend configuration, a long and short I-RNTI. The one to be used in resume depends on an indication from the network in system information of the cell the UE tries to resume in. The two I-RNTI identifiers were introduced to support scenarios when the UE is resuming in a cell which only gives the UE a small scheduling grant for the first UL message. For this purpose, also two different resume messages have been introduced namely RRCResumeRequest and RRCResumeRequest1. In the remainder of this document RRC resume request is used to refer to both messages.

At the next transition to NR RRC_CONNECTED, the UE resumes the connection by sending an RRC resume request including the following information to the gNB which the UE attempts to resume the connection towards. It should be noted that it may be another cell/gNB compared to the cell/gNB where the connection was suspended.

The I-RNTI, either the long or short I-RNTI depending on the system information indication.
A security token, referred to as resumeMAC-I in the specification, which is used to identify and verify the UE at RRC connection resume.
An indication of the cause of the resume, e.g. mobile originated data.

The gNB which serves the cell in which the UE is resuming is sometimes referred to as the target gNB, while the gNB serving the cell in which the UE was suspended in is sometimes referred to as the source gNB. To resume the connection, the target gNB determines which gNB is the source gNB, considering the gNB part of the I-RNTI, and request that gNB to send the UE's context. In the request the target provides, among other things, the UE ID and security token received from the UE as well as the target cell Cell ID.

The source gNB then locates the UE context based on the I-RNTI and verifies the request based on the security token, see next section. If successful, the gNB forwards the UE context to the target gNB, which then responds to the UE with RRC resume to confirm the connection is being resumed. The RRC resume message may also comprise configurations to reconfigure the radio bearers being resumed. Finally, the UE acknowledges the reception of the RRC re-establishment by sending RRC re-establishment complete. See FIG. 5.

It should be noted that the described NR RRC resume procedure works in a similar way in LTE and eLTE, i.e. when LTE is connected to 5GC.

For 3GPP Release-15, it is agreed that the UE releases its lower-layer SCG configuration in RRC_INACTIVE. However, keeping the lower layer SCG configuration in RRC_INACTIVE will be discussed in the scope of the DC and/or CA enhancements, and is likely to be enabled. It is also expected that the suspend and/or resume concerning SCG may be captured within current defined messages and procedures for suspend and/or resume. Therefore, no distinct behavior would be given to SCG configuration compared to MCG configuration when suspended and/or resumed, i.e. when suspending the UE, both MCG and SCG are suspended, which would require some coordination between MN and SN; when resuming the UE, both MCG and SCG are resumed, which would also require some coordination between MN and SN.

It is not only the RRCResume message that may be sent in response to the RRCResumeRequest message.

In NR and eLTE, after the UE sends an RRC Resume Request kind of message, e.g. RRCResumeRequest message or RRCResumeRequest1 message, the UE may receive a message on SRB1 that should also be encrypted, and integrity protected, as described above:

RRCRelease with suspend configuration moving the UE to RRC_INACTIVE;
RRCRelease without suspend configuration moving the UE to RRC_IDLE;
RRCResume moving the UE to RRC_CONNECTED;

Other messages may also be transmitted, an RRCReject message with wait timer or RRCSetup message (fallback to RRC_IDLE) but on SRB0, i.e. not encrypted or integrity protected. An SRB is a Signaling Radio Bearer. All these possible responses are shown as follows in the specifications:

FIG. 6a depicts a scenario of a RRC connection resume, successful. In this scenario the UE sends an RRCResumeRequest message to the Network. The network then sends a RRCResume message to the UE which responds to the network with a RRCResumeComplete message.

FIG. 6b depicts a scenario of a RRC connection resume fallback to RRC connection establishment, successful. In this scenario the UE sends an RRCResumeRequest message to the Network. The network then sends a RRCSetup message to the UE which responds to the network with a RRCSetupComplete message.

FIG. 6c depicts a scenario of an RRC connection resume followed by network release, successful. In this scenario the UE sends an RRCResumeRequest message to the Network. The network then sends an RRCRelease message to the UE.

FIG. 6d depicts a scenario of an RRC connection resume followed by network suspend, successful. In this scenario the UE sends an RRCResumeRequest message to the Network. The network then sends an RRCRelease with suspend configuration message to the UE.

FIG. 6e depicts a scenario of an RRC connection resume, network reject. In this scenario the UE sends an RRCResumeRequest message to the Network. The network then sends an RRCReject message to the UE.

DC Operations

The general operations related to MR-DC are captured in 3GPP TS 37.340. The ones related to MR-DC with 5GC are reproduced in this section. For EN-DC procedures slightly differing can be found in clause 10 from 3GPP TS 37.340.

Secondary Node Addition

The Secondary Node (SN) Addition procedure is initiated by the MN and is used to establish a UE context at the SN in order to provide radio resources from the SN to the UE. For bearers requiring SCG radio resources, this procedure is used to add at least the initial SCG serving cell of the SCG. This procedure may also be used to configure an SN terminated MCG bearer, where no SCG configuration is needed. FIG. 10.2.2-1 shows the SN Addition procedure.

FIG. 7 depicts actions 1-12 of an SN Addition procedure.

Action 1. The MN decides to request the target SN to allocate radio resources for one or more specific PDU Sessions/QoS Flows, indicating QoS Flows characteristics (QoS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. The MN always provides all the needed security information to the SN (even if no SN terminated bearers are setup) to enable SRB3 to be setup based on SN decision. For bearer options that require Xn-U resources between the MN and the SN, MN needs to provide Xn-U TNL address information, Xn-U DL TNL address information for SN terminated bearers and Xn-U UL TNL address information for MN terminated bearers. The SN may reject the request.

NOTE 1: For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in action 1 by the QoS Flow parameters signalled to the SN, which may differ from QoS Flow parameters received over NG.

NOTE 2: For a specific QoS flow, the MN may request the direct establishment of SCG and/or split bearers, i.e. without first having to establish MCG bearers. It is also allowed that all QoS flows can be mapped to SN terminated bearers, i.e. there is no QoS flow mapped to an MN terminated bearer.

Action 2. If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration may be performed. The SN decides for the PScell and other SCG Scells and provides the new SCG radio resource configuration to the MN in a SN RRC configuration message contained in the SN Addition Request Acknowledge message. In case of bearer options that require Xn-U resources between the MN and the SN, the SN provides Xn-U TNL address information for the respective E-RAB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided.

NOTE 3: In case of MN terminated bearers, transmission of user plane data may take place after action 2.

NOTE 4: In case of SN terminated bearers, data forwarding and the SN Status Transfer may take place after action 2.

NOTE 5: For MN terminated NR SCG bearers for which PDCP duplication with CA is configured the MN allocates 2 separate Xn-U bearers.

For SN terminated NR MCG bearers for which PDCP duplication with CA is configured the SN allocates 2 separate Xn-U bearers.

Action 3. The MN sends the MN RRC reconfiguration message to the UE including the SN RRC configuration message, without modifying it.

Action 4. The UE applies the new configuration and replies to MN with MN RRC reconfiguration complete message, including a SN RRC response message for SN, if needed. In case the UE is unable to comply with (part of) the configuration included in the MN RRC reconfiguration message, it performs the reconfiguration failure procedure.

Action 5. The MN informs the SN that the UE has completed the reconfiguration procedure successfully via SN Reconfiguration Complete message, including the encoded SN RRC response message, if received from the UE.

Action 6. If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure.

Action 7. In case of SN terminated bearers using RLC AM, the MN sends SN Status Transfer.

Action 8. In case of SN terminated bearers using RLC AM, and dependent on the bearer characteristics of the respective QoS Flows, the MN may take actions to minimise service interruption due to activation of MR-DC (Data forwarding).

Action 9-12. For SN terminated bearers, the update of the UP path towards the 5GC is performed via PDU Session Path Update procedure.

Secondary Node Release, MN Initiated

The SN Release procedure may be initiated either by the MN or by the SN and is used to initiate the release of the UE context and relevant resources at the SN. The recipient node of this request can reject it, e.g., if a SN change procedure is triggered by the SN.

MN Initiated SN Release

FIG. 8 depicts actions 1-8 of an example signalling flow for an MN initiated SN Release procedure.

Action 1. The MN initiates the procedure by sending the SN Release Request message. If data forwarding is requested, the MN provides data forwarding addresses to the SN.

Action 2. The SN confirms SN Release by sending the SN Release Request Acknowledge message. If appropriate, the SN may reject SN Release, e.g., if the SN change procedure is triggered by the SN.

Action 3/4. If required, the MN indicates in the MN RRC reconfiguration message towards the UE that the UE shall release the entire SCG configuration. In case the UE is unable to comply with (part of) the configuration included in the MN RRC reconfiguration message, it performs the reconfiguration failure procedure.

NOTE 1: If data forwarding is applied, timely coordination between actions 1 and 2 of FIG. 8 may minimize gaps in service provision, this is however regarded to be an implementation matter.

Action 5. If the released bearers use RLC AM, the SN sends the SN Status transfer.

Action 6. Data forwarding from the SN to the MN takes place.

Action 7. If applicable, the PDU Session path update procedure is initiated.

Action 8. Upon reception of the UE Context Release message, the SN can release radio and C-plane related resource associated to the UE context. Any ongoing data forwarding may continue.

MN Initiated SN Change

The MN initiated SN change procedure is used to transfer a UE context from the source SN to a target SN and to change the SCG configuration in UE from one SN to another.

The Secondary Node Change procedure may always involves signalling over MCG SRB towards the UE.

FIG. 9 shows actions 1-15 of an example signalling flow for the SN Change initiated by the MN.

Action 1/2. The MN initiates the SN change by requesting the target SN to allocate resources for the UE by means of the SN Addition procedure. The MN may include measurement results related to the target SN. If data forwarding is needed, the target SN provides data forwarding addresses to the MN. The target SN includes the indication of the full or delta RRC configuration.

NOTE: The MN may send the SN Modification Request message (to the source SN) to request the current SCG configuration before action 1 of FIG. 9.

Action 3. If the allocation of target SN resources was successful, the MN initiates the release of the source SN resources including a Cause indicating SCG mobility. The Source SN may reject the release. If data forwarding is needed the MN provides data forwarding addresses to the source SN. If direct data forwarding is used for SN terminated bearers, the MN provides data forwarding addresses as received from the target SN to source SN. Reception of the SN Release Request message triggers the source SN to stop providing user data to the UE and, if applicable, to start data forwarding.

Action 4/5. The MN triggers the UE to apply the new configuration. The MN indicates the new configuration to the UE in the MN RRC reconfiguration message including the target SN RRC configuration message. The UE applies the new configuration and sends the MN RRC reconfiguration complete message, including the encoded SN RRC response message for the target SN, if needed. In case the UE is unable to comply with (part of) the configuration included in the MN RRC reconfiguration message, it performs the reconfiguration failure procedure.

Action 6. If the RRC connection reconfiguration procedure was successful, the MN informs the target SN via SN Reconfiguration Complete message with the encoded SN RRC response message for the target SN, if received from the UE.

Action 7. If configured with bearers requiring SCG radio resources the UE synchronizes to the target SN.

Action 8. For SN terminated bearers using RLC AM, the source SN sends the SN Status transfer, which the MN sends then to the target SN.

Action 9. If applicable, data forwarding from the source SN takes place. It may be initiated as early as the source SN receives the SN Release Request message from the MN.

Action 10-14. If one of the PDU session/QoS Flow was terminated at the source SN, path update procedure is triggered by the MN.

Action 15. Upon reception of the UE Context Release message, the source SN can release radio and C-plane related resource associated to the UE context. Any ongoing data forwarding may continue.

SN Initiated SN Change

The SN initiated SN change procedure is used to transfer a UE context from the source SN to a target SN and to change the SCG configuration in UE from one SN to another.

FIG. 10 shows an example signalling flow for the SN Change initiated by the SN:

Action 1. The source SN initiates the SN change procedure by sending the SN Change Required message, which contains a candidate target node ID and may include the SCG configuration (to support delta configuration) and measurement results related to the target SN.

Action 2/3. The MN requests the target SN to allocate resources for the UE by means of the SN Addition procedure, including the measurement results related to the target SN received from the source SN. If data forwarding is needed, the target SN provides data forwarding addresses to the MN. The target SN includes the indication of the full or delta RRC configuration.

Action 4/5. The MN triggers the UE to apply the new configuration. The MN indicates the new configuration to the UE in the MN RRC reconfiguration message including the SN RRC configuration message generated by the target SN. The UE applies the new configuration and sends the MN RRC reconfiguration complete message, including the encoded SN RRC response message for the target SN, if needed. In case the UE is unable to comply with (part of) the configuration included in the MN RRC reconfiguration message, it performs the reconfiguration failure procedure.

Action 6. If the allocation of target SN resources was successful, the MN confirms the change of the source SN. If data forwarding is needed the MN provides data forwarding addresses to the source SN. If direct data forwarding is used for SN terminated bearers, the MN provides data forwarding addresses as received from the target SN to source SN. Reception of the SN Change Confirm message triggers the source SN to stop providing user data to the UE and, if applicable, to start data forwarding.

Action 7. If the RRC connection reconfiguration procedure was successful, the MN informs the target SN via SN Reconfiguration Complete message with the encoded SN RRC response message for the target SN, if received from the UE.

Action 8. The UE synchronizes to the target SN.

Action 9. For SN terminated bearers using RLC AM, the source SN sends the SN Status transfer, which the MN sends then to the target SN.

Action 10. If applicable, data forwarding from the source SN takes place. It may be initiated as early as the source SN receives the SN Change Confirm message from the MN.

Action 11-15. If one of the PDU session/QoS Flow was terminated at the source SN, path update procedure is triggered by the MN.

Action 16. Upon reception of the UE Context Release message, the source SN can release radio and C-plane related resource associated to the UE context. Any ongoing data forwarding may continue.

DC Coordination

In order to not exceed UE capabilities, MN and SN coordinate among e.g. band combinations, measurements, and the maximum power for a first frequency band e.g. referred to as FR1, the UE can use in SCG. In RRC, the MN sends restrictions concerning SCG configuration to the SN in a CG-ConfigInfo message. The SN responds with CG-Config message and may request for configurations outside the scope of the restricted configuration indicated by the MN. However, it is up to the MN to decide on how to resolve the dependency between MN and SN configurations. The MN then provides the resulting UE capabilities usable for SCG configuration to the SN.

RRC Message Structures

In this section, the structure of the messages, reconfiguration and resume and also related Information Elements (IEs) are shown, considering that the MN is a gNB. For (ng-)eNB as the MN, different messages are defined in clause 6.2.2 from 3GPP TS 36.331 RRCConnectionReconfiguration, and RRCConnectionResume messages, though the behavior is similar to gNB as the MN, as detailed in section 2.13 and 2.14.

NR RRCReconfiguration Message

The NR RRCReconfiguration message is shown below:

```
-- ASN1START
-- TAG-RRCRECONFIGURATION-START
RRCReconfiguration ::=                   SEQUENCE {
    rrc-TransactionIdentifier            RRC-TransactionIdentifier,
    criticalExtensions                   CHOICE {
        rrcReconfiguration
RRCReconfiguration-IEs,
        criticalExtensionsFuture         SEQUENCE { }
    }
}
RRCReconfiguration-IEs ::=               SEQUENCE {
    radioBearerConfig
RadioBearerConfig
OPTIONAL, -- Need M
    secondaryCellGroup          OCTET STRING
(CONTAINING CellGroupConfig)
OPTIONAL, -- Need M
    measConfig                           MeasConfig
OPTIONAL, -- Need M
    lateNonCriticalExtension             OCTET STRING
OPTIONAL,
    nonCriticalExtension
RRCReconfiguration-v1530-IEs
OPTIONAL
}
RRCReconfiguration-v1530-IEs ::=         SEQUENCE {
    masterCellGroup             OCTET STRING
(CONTAINING CellGroupConfig)
OPTIONAL, -- Need M
    fullConfig                           ENUMERATED
{true}
OPTIONAL, -- Cond FullConfig
    dedicatedNAS-MessageList             SEQUENCE
(SIZE(1..maxDRB)) OF DedicatedNAS-Message
OPTIONAL, -- Cond nonHO
```

```
    masterKeyUpdate            MasterKeyUpdate
OPTIONAL, -- Cond MasterKeyChange
    dedicatedSIB1-Delivery     OCTET STRING
(CONTAINING SIB1)
OPTIONAL, -- Need N
    dedicatedSystemInformationDelivery  OCTET STRING
(CONTAINING SystemInformation)
OPTIONAL, -- Need N
    otherConfig                OtherConfig
OPTIONAL, -- Need N
    nonCriticalExtension
RRCReconfiguration-v15xy-IEs
OPTIONAL
}
RRCReconfiguration-v15xy-IEs ::=   SEQUENCE {
    mrdc-SecondaryCellGroup    CHOICE {
        nr-SCG                 OCTET STRING,
        eutra-SCG              OCTET STRING
    }
OPTIONAL, -- Need M
    radioBearerConfig2         OCTET STRING
(CONTAINING RadioBearerConfig)
OPTIONAL, -- Need M
    sk-Counter                 INTEGER
(0..65535)
OPTIONAL, -- Cond S-KeyChange
    nonCriticalExtension       SEQUENCE { }
OPTIONAL
}
MasterKeyUpdate ::=            SEQUENCE {
    keySetChangeIndicator      BOOLEAN,
    nextHopChainingCount       NextHopChainingCount,
    nas-Container              OCTET STRING
        OPTIONAL,              -- Cond securityNASC
    ...
}
```

The information elements underlined above are described below.

RadioBearerConfig: This is the IE that holds the configuration of the radio bearers (DRBs and SRBs). A UE may have two radio bearer configurations (radioBearerConfig and radioBearerConfig2). RadioBeaerConfig2 is usually used when the UE is in DC, but it can be used even before the UE is standalone mode (i.e. to prepare for a DC). The radioBearerConfig and radioBearerConfig2 are mainly distinguished by the security configuration (keys, algorithms) used by the PDCP. Normally, radioBearerConfig holds the configuration of the bearers associated with the master key while radioBearerConfig2 holds the configuration of the bearers associated with the secondary key. However, it is up to the network to decide which IE to associate to which key, because the radio bearer configuration contains the key to use as well (i.e. radioBeaerConfig2 can be associated with the secondary key). The structure of the radioBearerConfig is shown below:

```
-- ASN1START
-- TAG-RADIO-BEARER-CONFIG-START
RadioBearerConfig ::=          SEQUENCE {
    srb-ToAddModList           SRB-ToAddModList
OPTIONAL,                      -- Cond HO-Conn
    srb3-ToRelease             ENUMERATED{true}
OPTIONAL,                      -- Need N
    drb-ToAddModList           DRB-ToAddModList
OPTIONAL,                      -- Cond HO-toNR
    drb-ToReleaseList          DRB-
ToReleaseList
OPTIONAL,                      -- Need N
    securityConfig             SecurityConfig
OPTIONAL,                      -- Need M
    ...
}
SRB-ToAddModList ::=           SEQUENCE (SIZE
(1..2)) OF SRB-ToAddMod
SRB-ToAddMod ::=               SEQUENCE {
    srb-Identity               SRB-Identity,
    reestablishPDCP            ENUMERATED{true}
OPTIONAL,                      -- Need N
    discardOnPDCP              ENUMERATED{true}
OPTIONAL,                      -- Need N
    pdcp-Config                PDCP-Config
OPTIONAL,                      -- Cond PDCP
    ...
}
DRB-ToAddModList ::=           SEQUENCE (SIZE
(1..maxDRB)) OF DRB-ToAddMod
DRB-ToAddMod ::=               SEQUENCE {
    cnAssociation              CHOICE {
        eps-BearerIdentity     INTEGER
(0..15),
        sdap-Config            SDAP-Config
-- 5GC
    }                          OPTIONAL, --
Cond DRBSetup
    drb-Identity               DRB-Identity,
    reestablishPDCP            ENUMERATED{true}
OPTIONAL,                      -- Need N
    recoverPDCP                ENUMERATED{true}
OPTIONAL,                      -- Need N
    pdcp-Config                PDCP-Config
OPTIONAL,                      -- Cond PDCP
    ...
}
DRB-ToReleaseList ::=          SEQUENCE (SIZE
(1..maxDRB)) OF DRB-Identity
SecurityConfig ::=             SEQUENCE {
    securityAlgorithmConfig
SecurityAlgorithmConfig
OPTIONAL,                      -- Cond RBTermChange
    keyToUse
ENUMERATED{master, secondary}
OPTIONAL,                      -- Cond RBTermChange
    ...
}
``` sk-counter: is an integer that is used to derive the secondary key. When the UE is configured with DC (or pre-prepared for DC), the sk-counter is provided to it, and it derives the secondary key based on that. From the secondary key, and the indicated algorithms in the SecurityConfig included in the radioBearerConfig, the encryption and integrity protection keys are derived and the PDCPs of all the radio bearers associated with the secondary key will use these keys to perform encryption/decryption and integrity protection/verification.

mastercellGroup: This includes the lower layer (RLC, MAC, PHY) configuration during standalone configuration, and also for the master leg during a DC setup.

mrdc-SecondaryCellGroup: This includes the lower layer configuration for the secondary cell group when DC is configured. For the case of NE-DC, this will include eutra-SCG, while for the case of NR-DC, it will include the NR cell group configuration.

In the case of EN-DC, NR is the secondary cell group and for this case, the IE secondaryCellGroup is used (i.e. the master cell group in this case will be an EUTRA cell group and is provided to the UE via the LTE RRCConnectionReconfiguration message)

The structure of the cell group config IE is shown below (cellGroupID of 0 indicates the master cell):

CellGroupConfig Information Element

```
-- ASN1START
-- TAG-CELL-GROUP-CONFIG-START
-- Configuration of one Cell-Group:
CellGroupConfig ::=                     SEQUENCE {
    cellGroupId                             CellGroupId,
    rlc-BearerToAddModList                  SEQUENCE
(SIZE(1..maxLC-ID)) OF RLC-BearerConfig
OPTIONAL,         -- Need N
    rlc-BearerToReleaseList                 SEQUENCE
(SIZE(1..maxLC-ID)) OF LogicalChannelIdentity
OPTIONAL,         -- Need N
    mac-CellGroupConfig                     MAC-
CellGroupConfig
OPTIONAL,         -- Need M
    physicalCellGroupConfig
PhysicalCellGroupConfig
OPTIONAL,         -- Need M
    spCellConfig                            SpCellConfig
OPTIONAL,         -- Need M
    sCellToAddModList                       SEQUENCE
(SIZE (1..maxNrofSCells)) OF SCellConfig
OPTIONAL,         -- Need N
    sCellToReleaseList                      SEQUENCE
(SIZE (1..maxNrofSCells)) OF SCellIndex
OPTIONAL,         -- Need N
    ....,
    [[
    reportUplinkTxDirectCurrent-v1530       ENUMERATED
{true}
OPTIONAL      -- Cond BWP-Reconfig
    ]]
}
-- Serving cell specific MAC and PHY parameters for a
SpCell:
SpCellConfig ::=                        SEQUENCE {
    servCellIndex                           ServCellIndex
OPTIONAL,         -- Cond SCG
    reconfigurationWithSync
ReconfigurationWithSync
OPTIONAL,         -- Cond ReconfWithSync
    rlf-TimersAndConstants                  SetupRelease { RLF-
TimersAndConstants }
OPTIONAL,         -- Need M
    rlmInSyncOutOfSyncThreshold             ENUMERATED {n1}
OPTIONAL,         -- Need S
    spCellConfigDedicated                   ServingCellConfig
OPTIONAL,         -- Need M
    ...
}
ReconfigurationWithSync ::=              SEQUENCE {
    spCellConfigCommon
ServingCellConfigCommon
OPTIONAL,         -- Need M
    newUE-Identity                          RNTI-Value,
    t304                                    ENUMERATED {ms50,
ms100, ms150, ms200, ms500, ms1000, ms2000, ms10000},
    rach-ConfigDedicated                    CHOICE {
        uplink                                  RACH-
ConfigDedicated,
        supplementaryUplink                     RACH-
ConfigDedicated
    }
OPTIONAL,         -- Need N
    ...,
    [[
    smtc                                    SSB-MTC
OPTIONAL      -- Need S
    ]]
}
SCellConfig ::=                         SEQUENCE {
    sCellIndex                              SCellIndex,
    sCellConfigCommon
ServingCellConfigCommon
OPTIONAL,         -- Cond SCellAdd
    sCellConfigDedicated                    ServingCellConfig
OPTIONAL,         -- Cond SCellAddMod
    ...,
    [[
    smtc                                    SSB-MTC
OPTIONAL      -- Need S
    ]]
}
-- TAG-CELL-GROUP-CONFIG-STOP
-- ASN1STOP
```

RRCResume

The structure of the RRCResume message is shown below:

RRCResume Message

```
-- AN1START
-- TAG-RRCRESUME-START
RRCResume ::=                           SEQUENCE {
    rrc-TransactionIdentifier               RRC-
TransactionIdentifier,
    criticalExtensions                      CHOICE }
        rrcResume                               RRCResume-IEs
        criticalExtensionsFuture                SEQUENCE { }
    }
}
RRCResume-IEs ::=                       SEQUENCE {
    radioBearerConfig                       RadioBearerConfig
OPTIONAL,         -- Need M
    masterCellGroup                         OCTET STRING
(CONTAINING CellGroupConfig)
OPTIONAL,         -- Need M
    measConfig                              MeasConfig
OPTIONAL,         -- Need M
    fullConfig                              ENUMERATED {true}
OPTIONAL,         -- Need N
    lateNonCriticalExtension                OCTET STRING
OPTIONAL,
    nonCriticalExtension                    RRCResume-v15xx-IEs
OPTIONAL
}
RRCResume-v15xx-IEs ::=                 SEQUENCE {
    radioBearerConfig2-r15x                 OCTET STRING
(CONTAINING RadioBearerConfig)
OPTIONAL,         -- Need M
    sk-Counter-r15x                         INTEGER (0..65535)
OPTIONAL,         -- Need N
    mrdc-SecondaryCellGroup                 CHOICE {
        nr-SCG                                  OCTET STRING,
        eutra-SCG                               OCTET STRING
    }
OPTIONAL,         -- Need M
    nonCriticalExtension                    SEQUENCE{ }
OPTIONAL
}
```

It should be noted that the NR specification is still evolving and the RRCReconfiguration and RRCResume messages shown above are not exactly the ones that can be found in the agreed specifications right now. For example, as of this writing, neither the reconfiguration nor the resume message contain the mrdc-SecondaryCellGroup field. We are assuming these will be introduced in the upcoming versions and the names that will be used in the specifications might end up being different.

SUMMARY

As a part of developing embodiments herein a problem was identified by the inventors and will first be discussed.

When a UE enters in better coverage conditions for a target SN than its current SN, the MN or current SN may trigger SN change procedure towards the target SN. However, when the UE is in coverage of multiple SNs, a frequent switching between SNs may generate unnecessary load towards both the UE and the network.

Namely, the target SN must reacquire the UE context and capabilities, and redo capability coordination with the MN. In addition, the MN has to perform path update procedure towards the target SN for the PDU sessions/QoS Flows terminated at the source SN. Finally, the UE must also perform delta configuration or full configuration of SCG resources when getting an according RRC message from the MN. In case of delta configuration, target SN also have to parse source SN configuration.

The aforementioned actions may thus be performed several times even though the same SNs may be involved on those operations.

An object of embodiments herein is to improve the performance of a communications network using multiple SCG configurations.

According to an aspect of embodiments herein, the object is achieved by a method performed by a User Equipment, UE, for handling multiple Secondary Cell Group, SCG, configurations in a wireless communications network.

The UE receives from a network node
- a first SCG configuration of a first Secondary Node, SN, and an indication of whether or not the first SCG is to be configured as active or inactive, and
- a second SCG configuration of a second SN, and an indication of whether or not the second SCG is to be configured as active or inactive. The multiple SCG configurations comprises at least the first SCG configuration and the second SCG configuration.

The UE then decides whether to handle each respective SCG configuration out of the multiple SCG configurations according to a first option or a second option based on its respective indication.

The first option comprises when one or more out of the respective multiple SCG configurations are indicated to be configured as inactive, storing that particular SCG configuration.

The second option comprises when one or more out of the respective multiple SCG configurations are indicated to be configured as active, activating that particular SCG configuration in the UE.

According to another aspect of embodiments herein, the object is achieved by a User Equipment, UE, configured to handle multiple Secondary Cell Group, SCG, configurations in a wireless communications network. The UE 120 further being configured to receive from a network node:
- a first SCG configuration of a first Secondary Node, SN, and an indication of whether or not the first SCG is to be configured as active or inactive, and
- a second SCG configuration of a second SN, and an indication of whether or not the second SCG is to be configured as active or inactive, wherein the multiple SCG configurations are adapted to comprises at least the first SCG configuration and the second SCG configuration, decide whether to handle each respective SCG configuration out of the multiple SCG configurations according to a first option or a second option based on its respective indication, wherein:
the first option is adapted to comprise: when one or more out of the respective multiple SCG configurations are indicated to be configured as inactive, store that particular SCG configuration, and
the second option is adapted to comprise: when one or more out of the respective multiple SCG configurations are indicated to be configured as active, activate that particular SCG configuration in the UE.

BRIEF DESCRIPTION OF THE DRAWINGS

Examples of embodiments herein are described in more detail with reference to attached drawings in which:

FIG. 12*a-d* are flowcharts depicting embodiments of a method in a UE.
FIGS. 21-24 are flowcharts illustrating methods implemented in a communication system including a host computer, a base station and a user equipment.

DETAILED DESCRIPTION

Embodiments provide mechanisms to handle multiple SCG configurations, including to add SCG configurations, remove SCG configurations, activate an SCG configuration and deactivate an SCG configuration, where the activation of one SCG configuration may imply the deactivation of all the rest. Some embodiments herein also makes it possible to deactivate all SCG configurations, i.e., release the SCG, while the UE still keeps the SCG configurations.

The activate, also referred to as resume, mechanism, may also enhanced to permit a UE, with inactive, also referred to as suspended, MCG and multiple SCG configurations, to be activated, e.g. change from RRC_INACTIVE to RRC_CO- NNECTED, with only MCG while keeping SCG configurations inactivated also referred to as suspended; or resuming one or more of the multiple suspended SCG configurations.

In the aforementioned mechanisms, multiple SCG configurations may refer to: a single SN with multiple SCG configurations; or multiple SNs with one or more SCG configurations.

Upon a change from source Secondary Node (SN) to a target SN, the UE may already have a suspended SCG configuration from the target SN, which enables the following advantages:

- Reduced signaling the between the network node such as e.g. a master Node (MN), and an SN upon SN change operations, e.g., no need to redo capability coordination;
- Reduced signaling towards the core network, e.g., no need to perform path update procedure; unless the same Quality of service (QoS) flow should be moved from one SN to another;
- Fast switching between SNs and/or SCGs or fast activation of SNs and/or SCGs
  a. UE already has a suspended configuration from the target SN and/or SCG(s);
  b. SN already has UE context and capabilities;
- If a UE is connected in dual connectivity, with active MCG and SCG configurations, the network may configure an additional suspended SCG configuration associated to a new cell. When the new SCG cell fulfills some criteria, e.g. a threshold better than the current PSCell, the network may inactivate the current SCG configuration and activate the new SCG configurations.
  a. The resume of a target SCG configuration can also be requested by the UE.

Upon transition from RRC_INACTIVE to RRC_CONNECTED, the some embodiments herein also enable:

If a UE is configured with multiple suspended SCG configurations, from active to inactive transition, and the UE is to change its state back to active, the network may quickly activate one of the inactive SCG configurations and keep the other SCG configuration in inactivated state also referred to as suspended state or simply release it.

Figure 11:
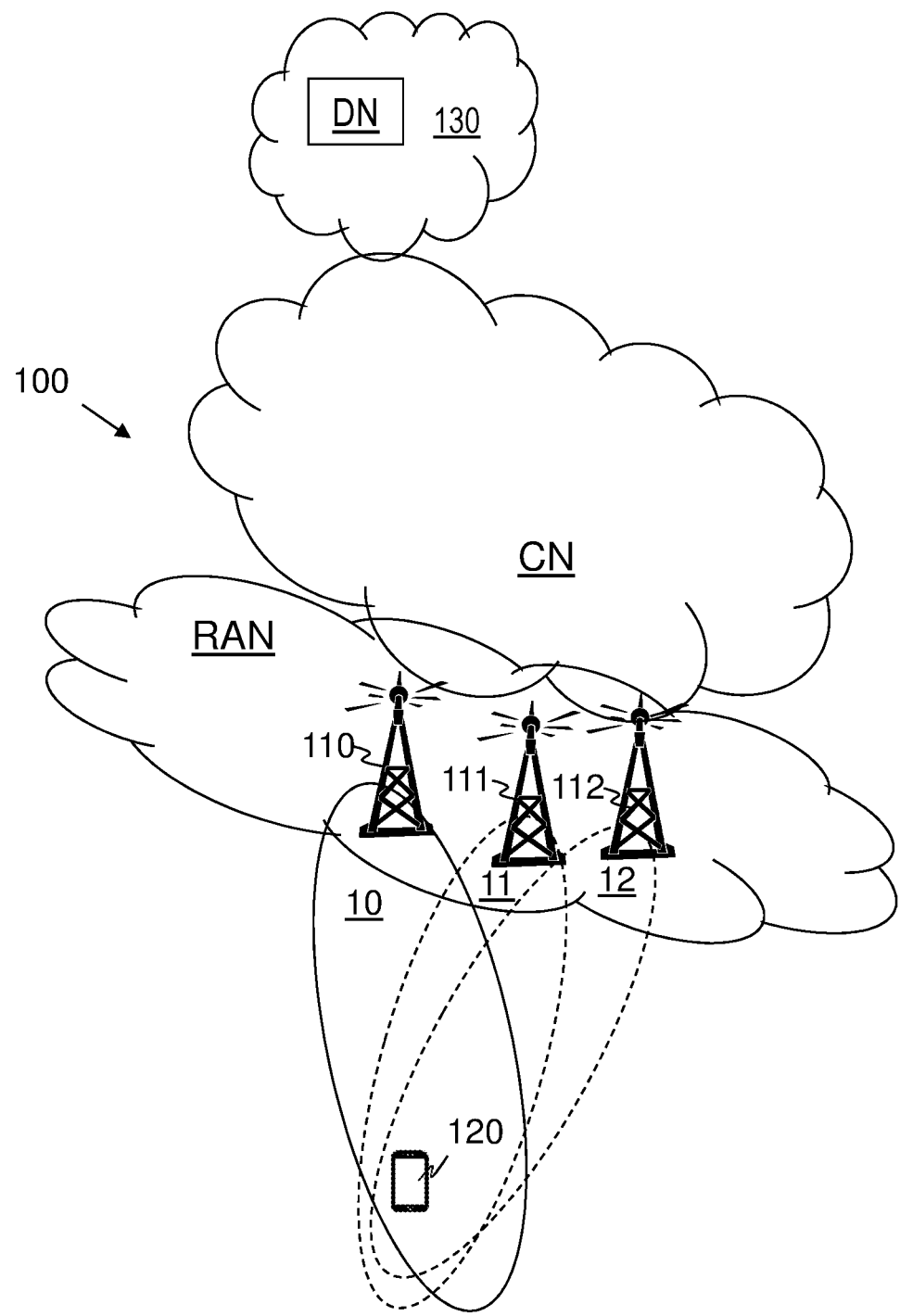
FIG. 11 is a schematic block diagram illustrating embodiments of a wireless communications network.

Embodiments herein relate to wireless communication networks in general. FIG. 11 is a schematic overview depicting a wireless communications network 100. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such as e.g. a network node 110, and a number of SNs such as e.g. a first SN 111 and a second SN 112. These nodes provide radio coverage in a number of cells which may also be referred to as a beam or a beam group of beams, such as a cell 10 provided by the network node 110, a cell 11 provided by the first SN 111, and a cell 12 provided by the second SN 112.

The network node 110 may e.g. be acting as a master Node (MN) or an SN when serving a UE 120 in the wireless communications network 100, according to embodiments herein. The first SN 111 may e.g. be acting as a source SN, and the second SN 112 may e.g. be acting as a target SN when serving the UE 120 in the wireless communications network 100, according to embodiments herein.

The network node 110, the first SN 111 and the second SN 112 may each be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), agNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The radio network node 110 may be referred to as a serving radio network node and communicates with a UE 120 with Downlink (DL) transmissions to the UE 120 and Uplink (UL) transmissions from the UE 120.

In the wireless communication network 100, one or more UEs operate, such as e.g. the UE 120. The UE 120 may also referred to as a device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Figure 1:
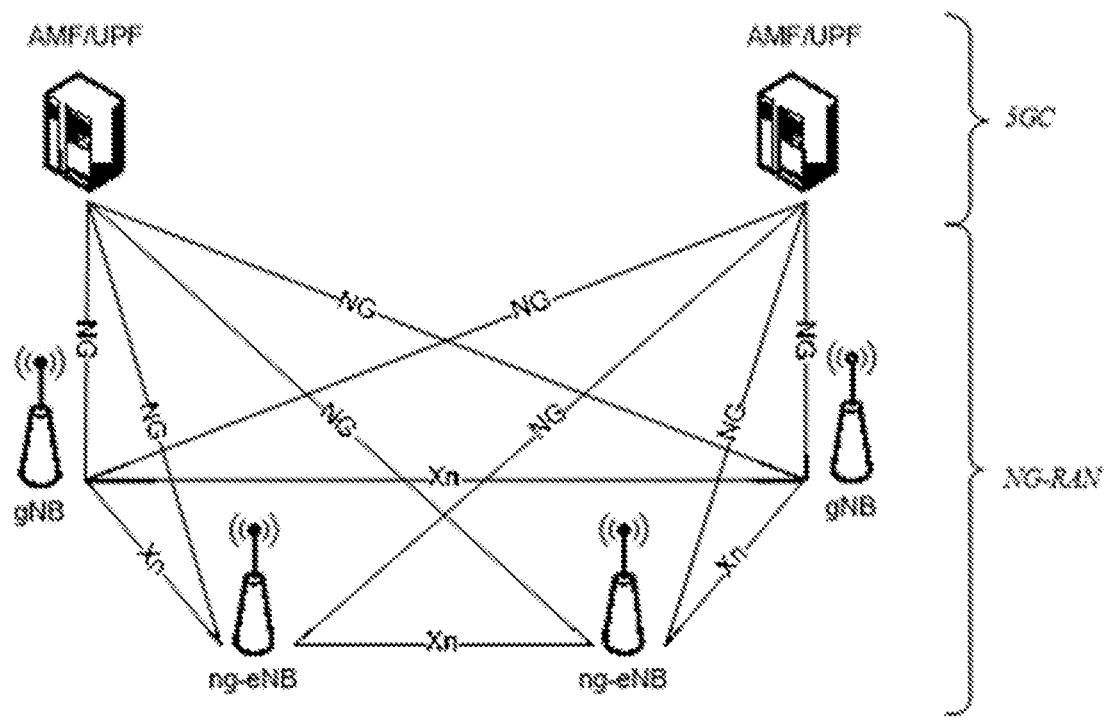
FIG. 1 is a schematic block diagram illustrating prior art.
Figure 2:
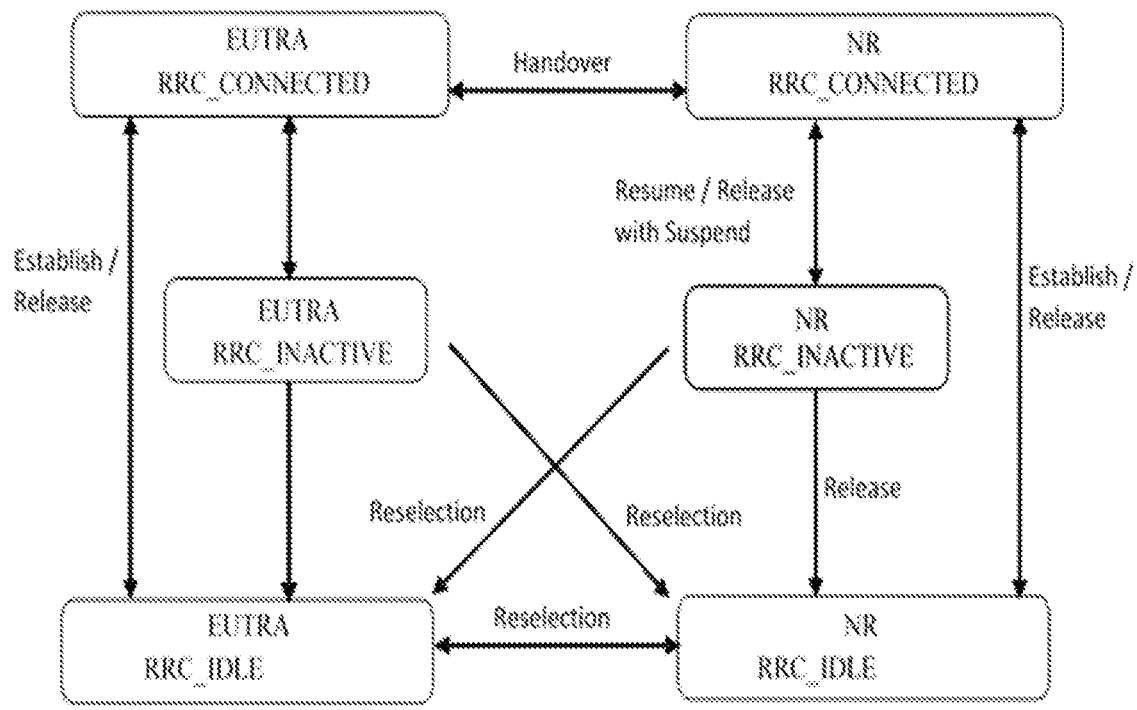
FIG. 2 is a schematic block diagram illustrating prior art.
Figure 3:
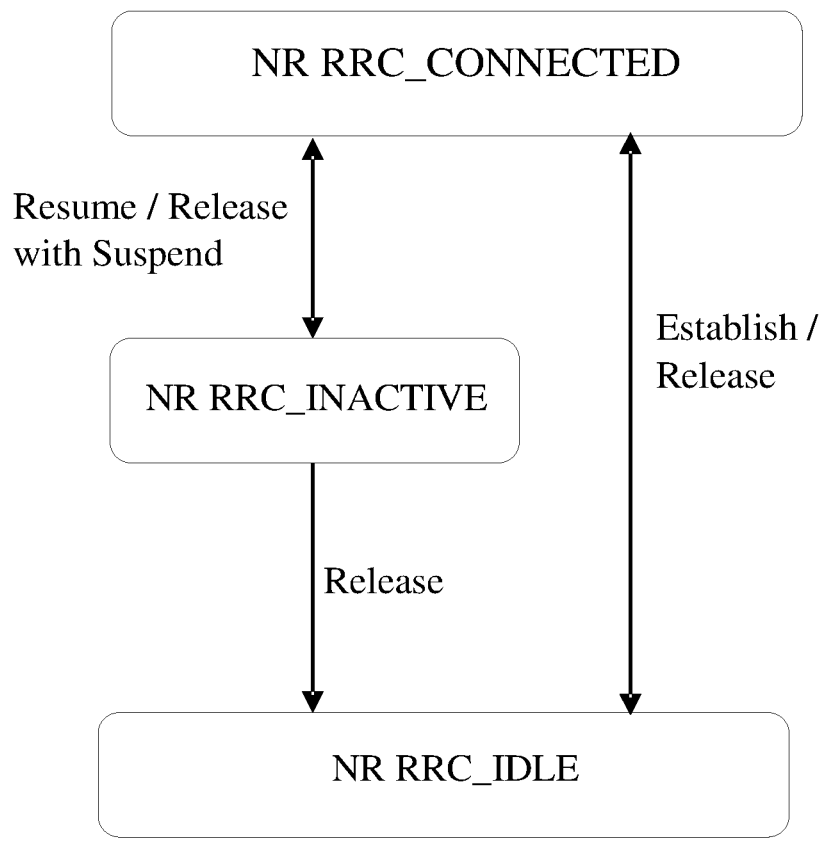
FIG. 3 is a schematic block diagram illustrating prior art.
Figure 4:
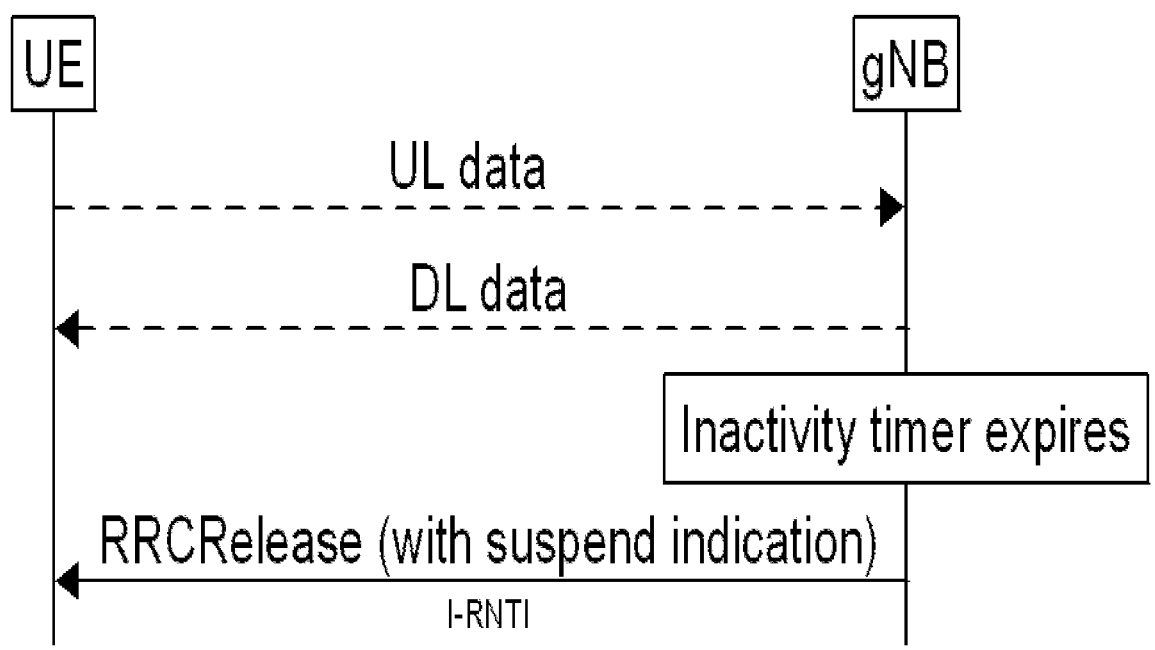
FIG. 4 is a sequence diagram illustrating prior art.
Figure 5:
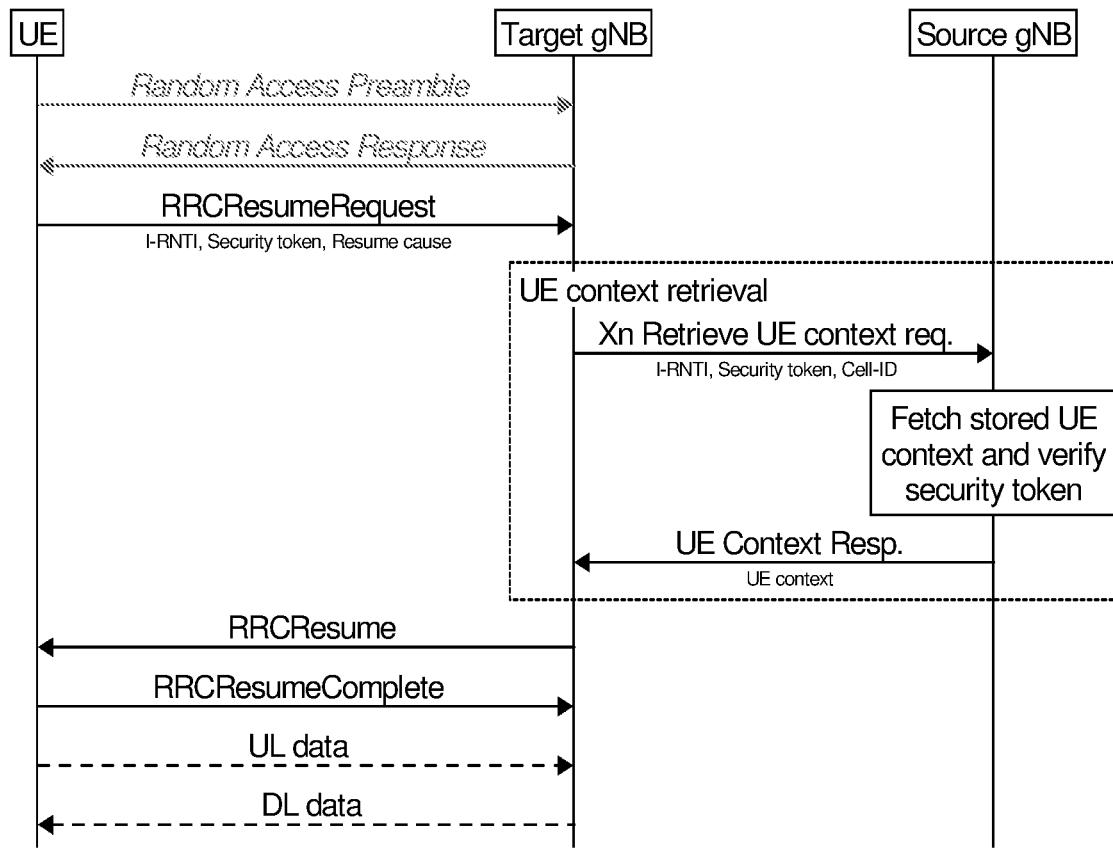
FIG. 5 is a sequence diagram illustrating prior art.
Figure 6A:
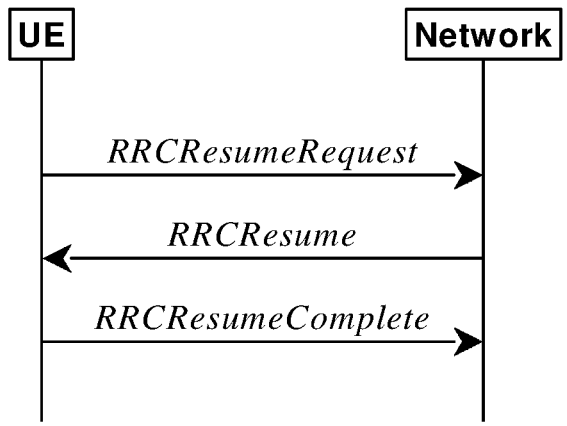
FIG. 6*a-e* are is a sequence diagrams illustrating prior art.
Figure 6B:
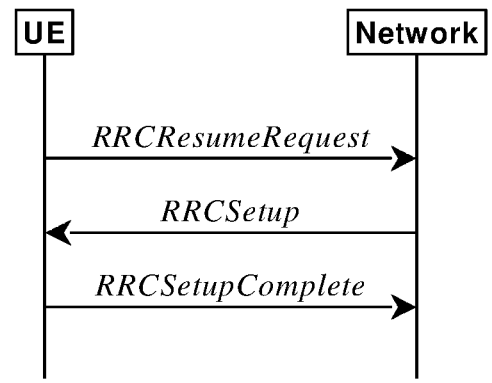
Figure 6C:
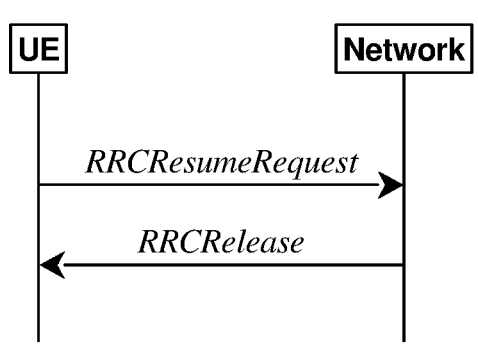
Figure 6D:
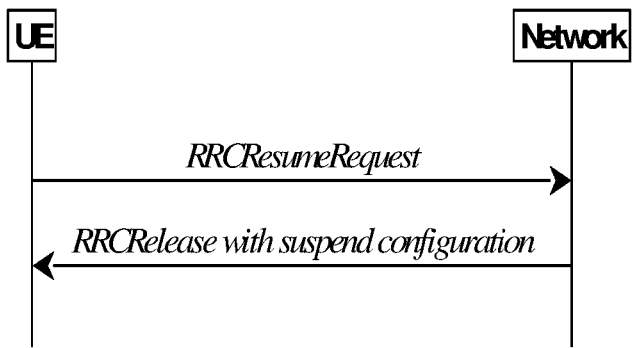
Figure 6E:
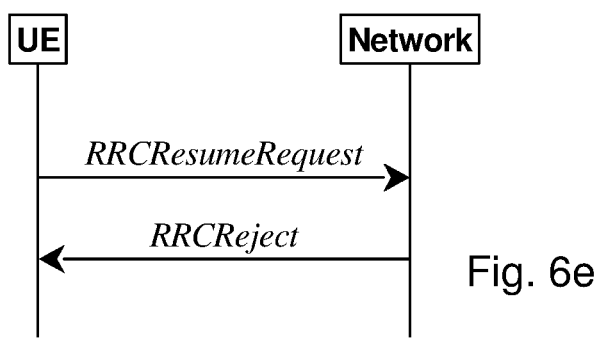
Figure 7:
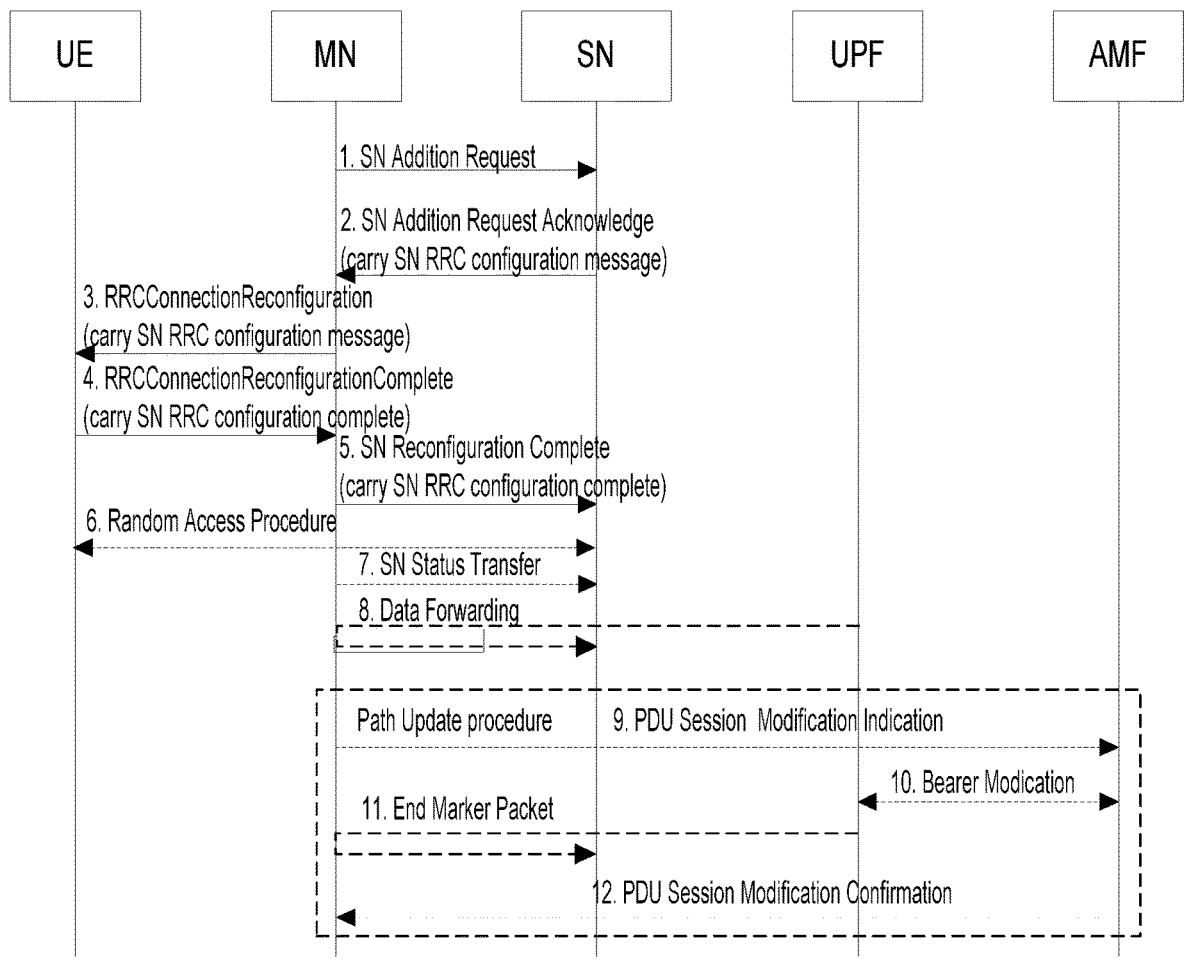
FIG. 7 is a sequence diagram illustrating prior art.
Figure 8:
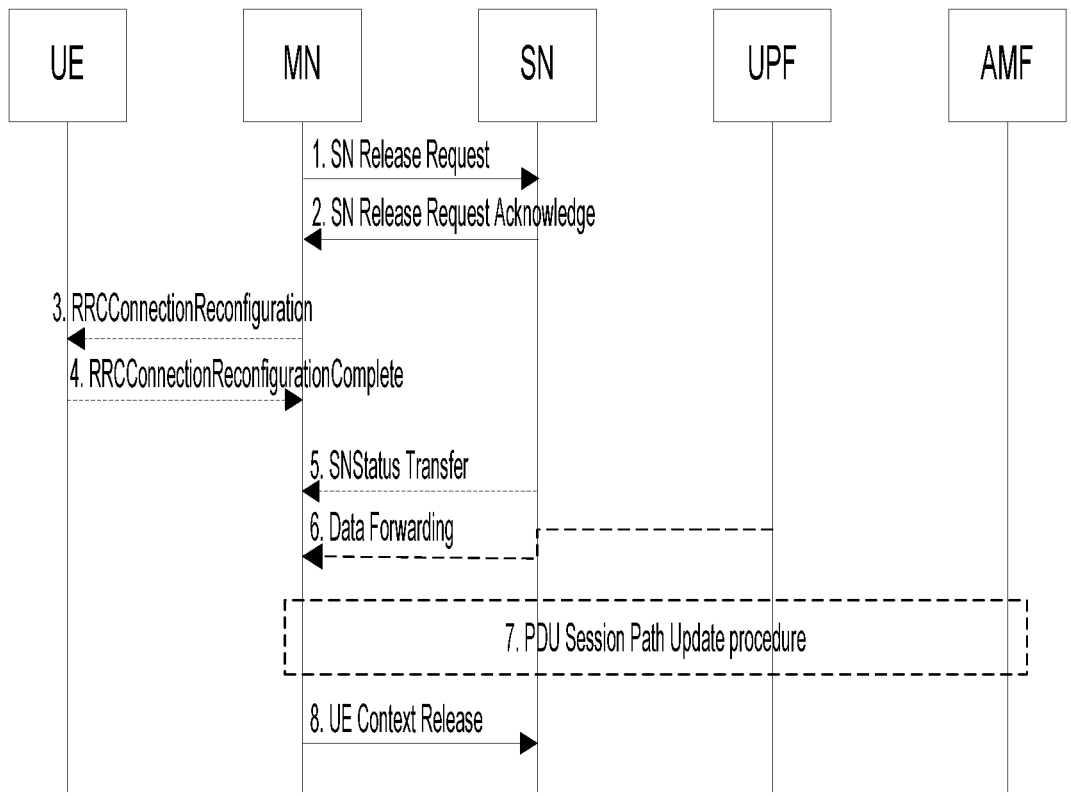
FIG. 8 is a sequence diagram illustrating prior art.
Figure 9:
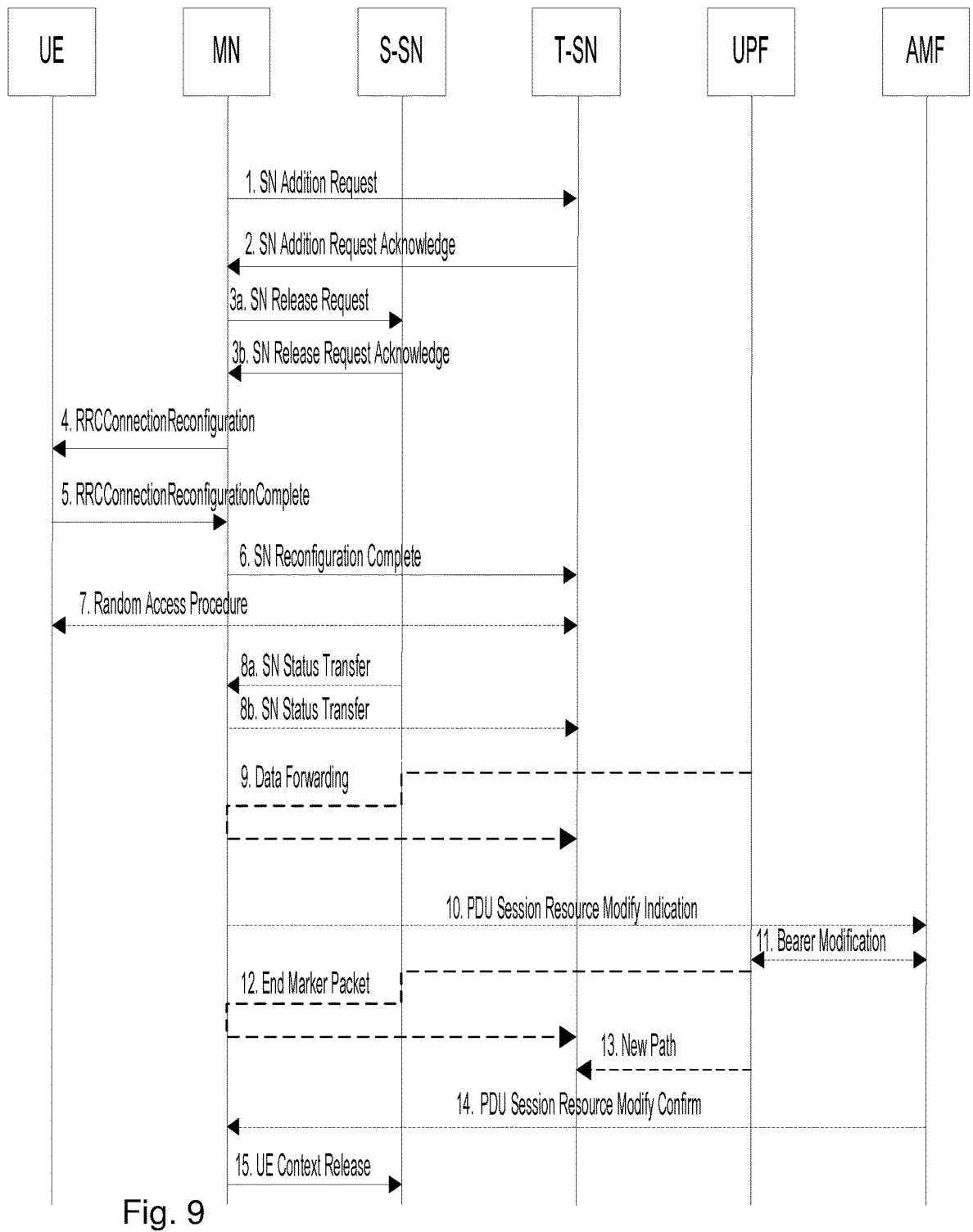
FIG. 9 is a sequence diagram illustrating prior art.
Figure 10:
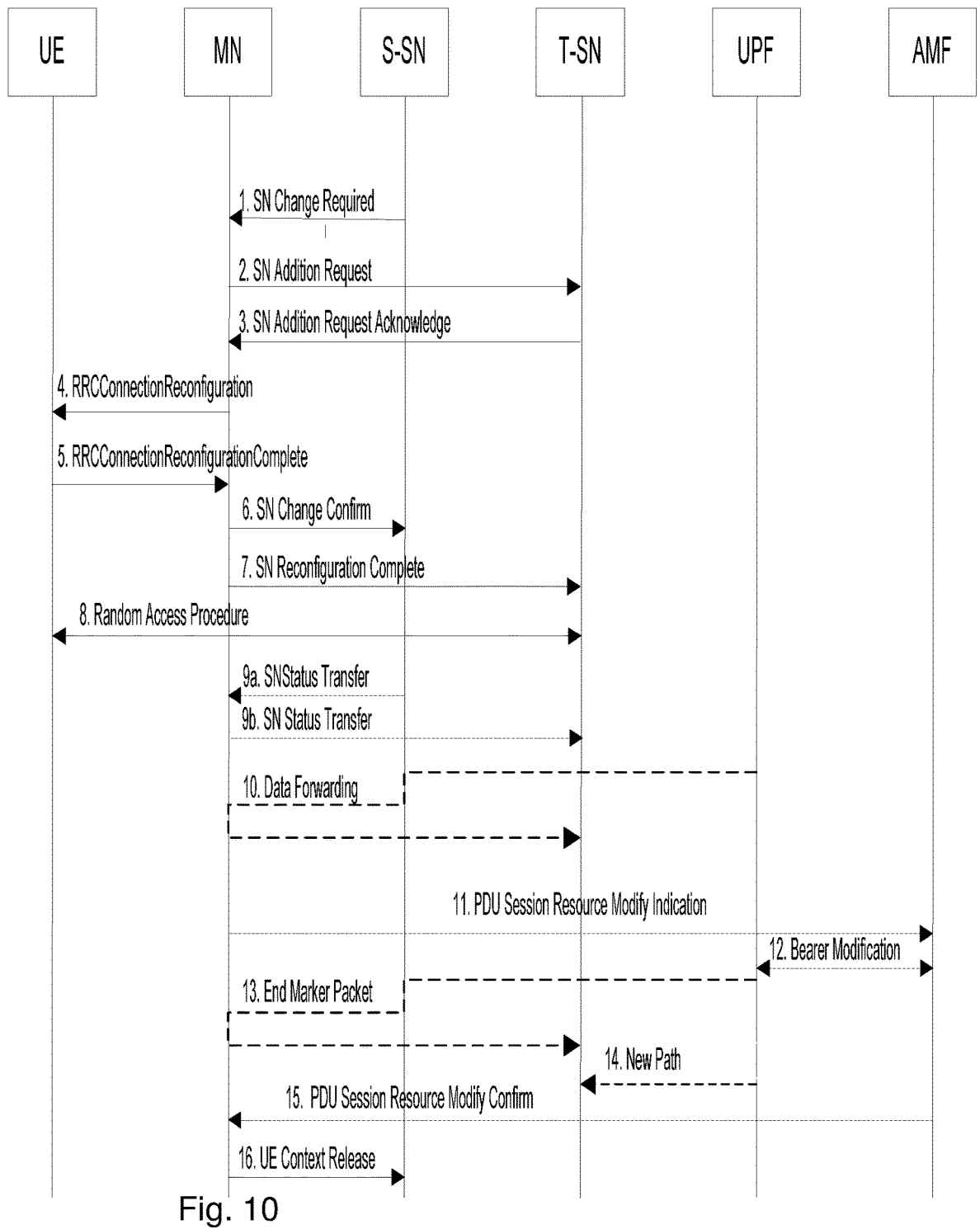
FIG. 10 is a sequence diagram illustrating prior art.

Methods herein may be performed by the UE 120. As an alternative, a Distributed Node (DN) and functionality, e.g. comprised in a cloud 130 as shown in FIG. 1, may be used for performing or partly performing the methods herein.

The above described problem is addressed in a number of embodiments, some of which may be seen as alternatives, while some may be used in combination.

It should be noted that the sections herein may e.g. refer to generically Multi-Radio Dual Connectivity (MR-DC) or a specific Dual Connectivity (DC) option, while example embodiments described herein may be applicable to any MR-DC option but comprise examples of a specific DC option.

Similarly, even though the sections above treat SCG configuration within the concept of suspend/resume, the embodiments described here may be also approached in a broader concept as the handling of SCG configuration irrespective of suspend/resume operation, i.e., methods can be used to activate/deactivate SCG configuration instead of referring to it as suspend/resume of SCG.

The terms activate and resume have been used interchangeably to signify the current SCG configuration(s) that is(are) going to be used at a given time by the UE 120 and the corresponding SN 111, 112.

The terms deactivate and suspend have been used interchangeably to signify the SCG configurations that are not being used but are saved/stored by the UE 120 and the corresponding SN 111, 112.

The description, specifically the messages and procedures shown, are mostly targeting NR. However, the mechanisms described herein are equally applicable for the case where the MN is LTE, i.e. EN-DC and NGEN-DC cases. In these cases, corresponding changes in the RRCConnectionReconfiguration, RRCConnectionResume messages and UE behaviour on processing these messages will be made in the LTE specifications.

Most of the description is for the examples where only one SCG is active at one time. However, the methods are equally applicable for the case where more than one SCG is active, i.e. the UE 120 being in DC with more than two nodes.

Embodiments herein e.g. comprise enhanced resume mechanisms to:
1. Permit the UE 120, with suspended MCG and multiple SCG configurations, to be resumed with only MCG while keeping SCGs suspended (change from RRC_INACTIVE to RRC_CONNECTED).
2. Permit the UE 120, with suspended MCG and multiple SCG configurations, to be resumed with MCG and one SCG while keeping other SCGs suspended (change from RRC_INACTIVE to RRC_CONNECTED).
   a. Permit the UE 120 with suspended MCG and multiple SCG configurations, to be resumed with MCG and multiple SCGs, while keeping other SCGs suspended, if any (change from RRC_INACTIVE to RRC_CONNECTED).
3. When the UE 120 is in RRC_CONNECTED, perform SCG suspend/resume operations (without affecting the MCG configuration) among the multiple SCGs while keeping at most one resumed SCG configuration.
   a. When the UE 120 is in RRC_CONNECTED, perform SCG suspend/resume operations (without affecting the MCG configuration) among the multiple SCGs while keeping multiple SCG configurations resumed.
4. Permit the UE 120 request of a specific SCG configuration to be resumed.
   a.
5. Reconfigure or setup a suspended SCG among multiple suspended SCGs, while the UE 120 is kept in RRC_CONNECTED.

Figure 12C:
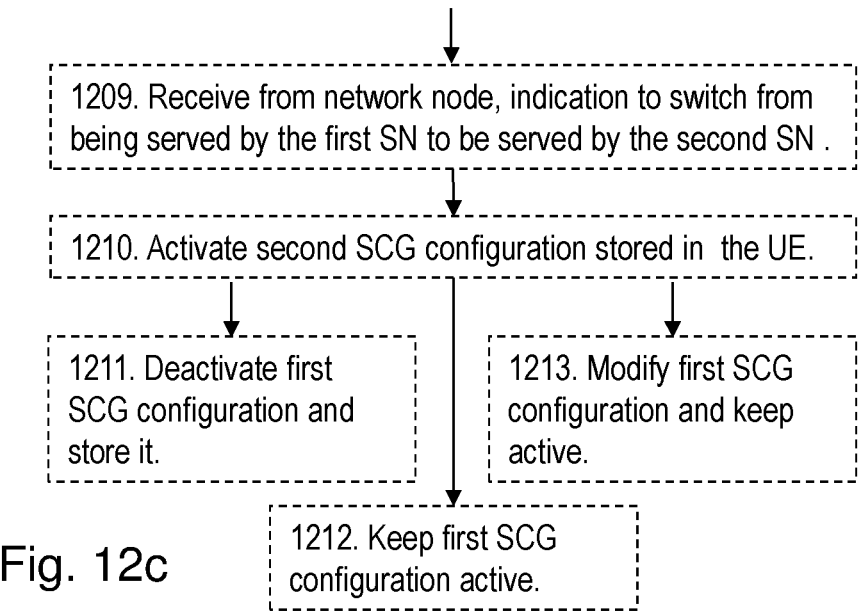

FIGS. 12a, 12b, 12c, and 12d show example embodiments of a method performed by the UE 120 for handling multiple SCG configurations in the wireless communications network 100. FIG. 12a depicts the common Actions 1201-1204. In an example scenario the network node 110 may be an MN, however, it may as well be an SN.

The method comprises the following actions, which actions may be taken in any suitable order.

Action 1201

The UE 120 receives at least a first SCG and a second SCG configuration. The UE 120 receives a first SCG configuration of the first SN 111 and an indication from the network node 110. The indication indicates whether or not the first SCG is to be configured as active or inactive. The first SN 111 may in an example scenario be referred to as a Source SN.

The UE 120 further receives a second SCG configuration of the second SN 112 and a further indication from the network node 110. This further indication indicates whether or not the second SCG is to be configured as active or inactive. It should be noted that the wording a second SCG configuration when used herein also relates to one or more second SCG configurations. The second SN 112 may in the example scenario be referred to as a target SN. It should be noted that the second SN 112 may be the same SN as first SN 111.

The multiple SCG configurations mentioned above comprise at least the first SCG configuration and the second SCG configuration.

Action 1202

The UE 120 then decides whether to handle each respective SCG configuration out of the multiple SCG configurations according to a first option or a second option based on its respective indication. The first option comprises to perform Action 1203 and the second option comprises to perform Action 1204.

As mentioned above, in some embodiments the UE 120 has received a list of SCG configuration and state information, comprising at least one element: {[SCG1, config1, state], [SCG2, config2, state], . . . [SCGN, config, state]}. In these embodiments, for each element in this list, the UE 120 may apply the configuration If the SCG exists: update the old configuration
    If old state was active and new state is active, no state change needed.
    If old state was active and new state is inactive, deactivate the SCG.
If the SCG doesn't exist:
    If the state is active, add the configuration and put it in active state.
    If the state is inactive, add the configuration but do not activate the SCG configuration.

Action 1203

First option: When one or more out of the respective multiple SCG configurations are indicated to be configured as inactive, the UE 120 stores that particular SCG configuration.

Action 1204

Second option: When one or more out of the respective multiple SCG configurations are indicated to be configured as active, the UE 120 activates that particular SCG configuration in the UE 120.

In some embodiments, according to a first example scenario, each of the respective first SCG configuration and second SCG configuration are inactive and stored in the UE 120. In these embodiments, the UE 120 may further perform any of Actions 1205-1206, or 1207-1208 depending on whether an indication received from the network node 110 is indicating that the UE 120 shall be served by the first SN 111 or second SN 112. FIG. 12b depicts the Actions 1205-1208 according to the first example scenario.

Action 1205

The UE 120 may receive from the network node 110, an indication to be served by the first SN 111.

Action 1206

When receiving the indication to be served by the first SN 111 from the network node 110, the UE 120 applies the first SCG configuration stored in the UE 120

Action 1207

The UE 120 receives from the network node 110, an indication to be served by the second SN 112.

Action 1208

When receiving from the network node 110, the indication to be served by the second SN 112, the UE 120 applies the second SCG configuration stored in the UE 120.

In some embodiments, according to a second example scenario alternative, the first SCG configuration is active and the UE 120 is served by the first SN 111, and the second SCG configuration is inactive and stored in the UE 120.

In these embodiments, the UE 120 may further perform any of Actions 1209-1213. FIG. 12c depicts the Actions 1209-1213 according to the second example scenario.

Action 1209

The UE 120 receives from the network node 110, an indication to switch from being served by the first SN 111 to be served by the second SN 112.

Action 1210

When receiving from the network node 110 the indication to switch from being served by the first SN 111 to be served by the second SN 112, the UE 120 activates the second SCG configuration stored in the UE 120.

In some embodiments of the second example scenario where Action 1210 has performed, the UE may further perform any of the actions 1211-1213. These actions relate to different possible alternatives how the UE 120 may handle the first SCG configuration when it has switched from being served by the first SN 111 to be served by the second SN 112.

Action 1211

The UE 120 may deactivate the first SCG configuration and store it in the UE 120, e.g. in a memory of the UE 120.

Action 1212

The UE 120 may keep the first SCG configuration active. In this case there are two active SCG configurations at the same time.

Action 1213

The UE 120 may modify the first SCG configuration active. This means that the first SCG configuration is kept active but it is modified.

Figure 12D:
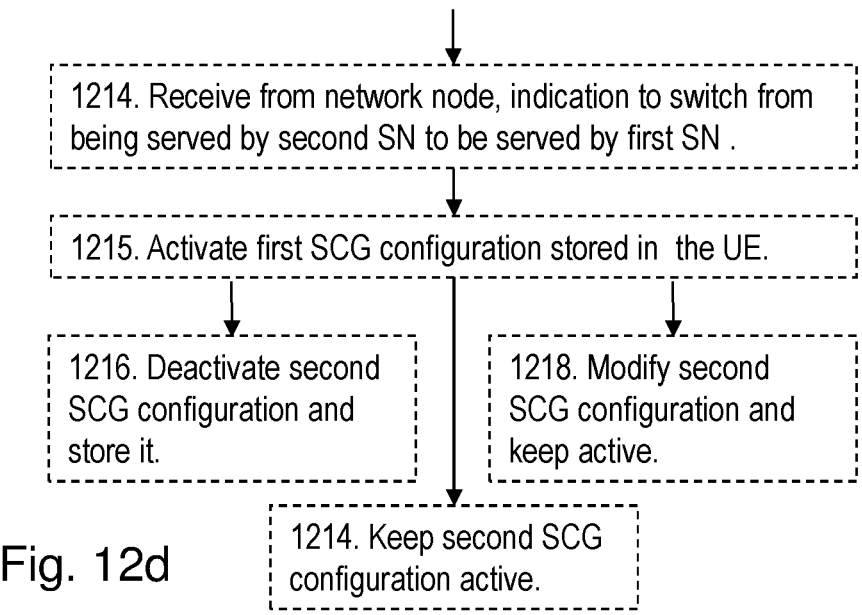

In some embodiments, according to a third example scenario alternative, it is the other way around compared to the second example scenario. In this third example scenario, the second SCG configuration is active and the UE 120 is served by the second SN 112, and wherein the first SCG configuration is inactive and stored in the UE 120. In these embodiments, the UE 120 may further perform any of Actions 1214-1218. FIG. 12d depicts the Actions 1214-1218 according to the third example scenario.

Action 1214

The UE 120 receives from the network node 110, an indication to switch from being served by the second SN 112 to be served by the first SN 111.

Action 1215

When receiving from the network node 110 the indication to switch from being served by the second SN 112 to be served by the first SN 111, the UE 120 activates the first SCG configuration stored in the UE 120.

In some embodiments of the third example scenario where Action 1215 has performed, the UE 120 may further perform any of the actions 1216-1218. These actions relate to different possible alternatives how the UE 120 may handle the second SCG configuration when it has switched from being served by the second SN 112 to be served by the first SN 111.

Action 1216

The UE 120 may deactivate the second SCG configuration and store it in the UE 120, e.g. in a memory of the UE 120.

Action 1217

The UE 120 may keep the second SCG configuration active. In this case there are two active SCG configurations at the same time.

Action 1218

The UE 120 may modify the second SCG configuration active. This means that the second SCG configuration is kept active but it is modified.

The above embodiments will now be further explained and exemplified below. The SCG configurations mentioned in the below examples relate to the first SCG (SCG1) configuration and the second SCG (SCG2) configuration as described above. The first SN is sometimes referred to as from SN1 and the second SN is sometimes referred to as SN2. The network node 110 are sometimes referred to as MN.

Enabling of Multiple SCG Configurations

The NR specification currently allows the configuration of a UE such as the UE 120 with only one SCG configuration, as may be seen from the RRCReconfiguration message structure shown in 3GPP section 2.1.7. The case is the same for LTE. When a UE such as the UE 120 already configured with a SCG gets an RRCReconfiguration comprising an SCG configuration, the previous SCG configuration may be updated also referred to as modified, e.g. if it was a delta configuration towards the same SN, or released and added (e.g. if the SN is being changed).

In some embodiments, the RRCReconfiguration message in NR and the corresponding procedures are enhanced to enable the UE 120 to be configured with multiple SCGs. An example RRCReconfiguration message that is enhanced to support this is shown below:

RRCReconfiguration Message

```
-- ASN1START
-- TAG-RRCRECONFIGURATION-START
RRCReconfiguration ::=                    SEQUENCE {
    rrc-TransactionIdentifier             RRC-TransactionIdentifier,
```

```
    criticalExtensions                              CHOICE {
        rrcReconfiguration
RRCReconfiguration-IEs,
        criticalExtensionsFuture                    SEQUENCE { }
    }
}
RRCReconfiguration-IEs ::=                          SEQUENCE {
    radioBearerConfig
RadioBearerConfig
OPTIONAL,                   -- Need M
    secondaryCellGroup                              OCTET STRING
(CONTAINING CellGroupConfig)
OPTIONAL,                   -- Need M
    measConfig                                      MeasConfig
OPTIONAL,                   -- Need M
    lateNonCriticalExtension                        OCTET STRING
OPTIONAL,
    nonCriticalExtension
RRCReconfiguration-v1530-IEs
OPTIONAL
}
RRCReconfiguration-v1530-IEs ::=                    SEQUENCE {
    masterCellGroup                                 OCTET STRING
(CONTAINING CellGroupConfig)
OPTIONAL,                   -- Need M
    fullConfig                                      ENUMERATED
{true}
OPTIONAL,                   -- Cond FullConfig
    dedicatedNAS-MessageList                        SEQUENCE
(SIZE(1..maxDRB)) OF DedicatedNAS-Message
OPTIONAL,                   -- Cond nonHO
    masterKeyUpdate                                 MasterKeyUpdate
OPTIONAL,                   -- Cond MasterKeyChange
    dedicatedSIB1-Delivery                          OCTET STRING
(CONTAINING SIB1)
OPTIONAL,                   -- Need N
    dedicatedSystemInformationDelivery              OCTET STRING
(CONTAINING SystemInformation)
OPTIONAL,                   -- Need N
    otherConfig                                     OtherConfig
OPTIONAL,                       -- Need N
    nonCriticalExtension
RRCReconfiguration-v15xy-IEs
OPTIONAL
}
RRCReconfiguration-v15xy-IEs ::=                    SEQUENCE {
    mrdc-SecondaryCellGroup                                 CHOICE {
                        nr-SCG      OCTET STRING,
                        eutra-SCG   OCTET STRING
    }
OPTIONAL,                   -- Need M
    radioBearerConfig2                              OCTET STRING
(CONTAINING RadioBearerConfig)
OPTIONAL,                   -- Need M
    sk-Counter                                      INTEGER
(0..65535)
OPTIONAL,                   -- Cond S-KeyChange
    suspendSCG                                      ENUMERATED {true}
OPTIONAL, -- Need N
scg-ToAddModList                    SCG-ToAddModList
OPTIONAL, -- Need N
scg-ToReleaseList                       SCG-ToReleaseList
OPTIONAL, -- Need N
    nonCriticalExtension                            SEQUENCE{ }
OPTIONAL
}
SCG-ToAddModList ::=                SEQUENCE (SIZE
(1..maxSCG)) OF SCG-ToAddMod
OPTIONAL,                   -- Need N
SCG-ToReleaseList ::=           SEQUENCE (SIZE
(1..maxSCG)) OF SCG-ID
OPTIONAL,                   -- Need N
SCG-ToAddMod                ::=         SEQUENCE {
                    scg-ID      SCG-ID,
                        resume              ENUMERATED {true}
OPTIONAL,
        sk-counter                      INTEGER (0..65535)
OPTIONAL,           -- Cond S-KeyChangeConfig
                    mrdc-MultipleSecondaryCellGroup
```

```
MRDC-MultipleSecondaryCellGroup
OPTIONAL, -- Need M
    }
OPTIONAL,                    -- Need M
MRDC-MultipleSecondaryCellGroup              CHOICE {
                    nr-SCG            OCTET STRING,
                    eutra-SCG                  OCTET STRING
    }
OPTIONAL,         -- Need M
SCG-ID ::= INTEGER (1.. maxSCG)
MasterKeyUpdate ::=                          SEQUENCE {
    keySetChangeIndicator                    BOOLEAN,
    nextHopChainingCount                     NextHopChainingCount,
    nas-Container                            OCTET STRING
        OPTIONAL,      -- Cond securityNASC
        ...
}
-- TAG-RRCRECONFIGURATION-STOP
-- ASN1STOP
```

| Conditional Presence | Explanation |
|---|---|
| S-KeyChangeConfig | In case of NR-DC; this field is mandatory upon Primary Secondary (PS)Cell addition (resumed also referred to as activated or suspended also referred to as inactive or deactivated), and optionally present, Need N upon PSCell change (resumed or suspended). In case of NE-DC, this field is mandatory upon PSCell addition or change (resumed or suspended). Otherwise, the field is absent. |

As shown above, an SCG-ToAddModList and SCG-ToReleaseList have been added to the RRCReconfiguration message.

In the SCG-ToAddMod, the field resume indicates whether that SCG is to be activated, also referred to as resumed (inactive/suspended), or not. By default, this field will not be included and the UE 120 may just store the SCG for later use, and keep using the already active/resumed SCG, if any. A UE such as the 120 may also have all SCG configurations inactive/suspended). In some embodiments according to a normal operation, there will be just one SCG active at a given time, and as such, only one of the entries in the SCG-ToAddMod will have the resume flag set. The reception of an SCG-ToAddMod comprising an entry with the resume flag on may thus be interpreted as the currently active/resumed SCG, if any, will be suspended.

Another field that may be comprised in the SCG-ToAddMod is the sk-counter field. As discussed in the background section the sk-counter may be used to calculate the secondary keys. In order to support multiple SCGs, it is thus an advantage to have multiple sk-counters, which the UE 120 may use to calculate the secondary key corresponding to each SCG.

It should be noted that the option of having more than one SCG active at the same time is not excluded, even though the use case for it may be limited. Thus, in order to support such a case, it could be possible to have the type of the resume field to be a BOOLEAN, where suspension of other SCGs may be communicated to the UE 120 explicitly, i.e. for the active ones, it will be set to TRUE, and for the ones to be suspended it will be set to FALSE.

In one alternative, the field mrdc-SecondaryCellGroup that is already been proposed for MR-DC configuration may be used if there is only one SCG and additional SCGs may be configured using the SCG-ToAddModList. In another alternative, if the network such as the network node 110 and/or the UE 120 can support the configuration of more than one SCG, all of them may be configured via SCG-ToAddModList. This means that the mrdc-SecondaryCellGroup and the SCG-ToAddModList will not be used at the same time. That is, even for the case of just one SCG, the SCG-ToAddModList may be used.

Another aspect, regarding multiple SCG configurations, is that current UE behavior in RRC_CONNECTED enables only one SCG. Considering fields within RRCReconfiguration message such as keyToUse, which enables the use of either master key or secondary key only, and fields such as drb-Identity, with limited range to be shared among multiple SN configurations, the RRC configuration is not completely designed for multiple SCGs.

Therefore, to enable multiple SCG configurations, the UE 120 may consider that if a given SCG configuration should be in suspended state, it would be stored and thus not applied as active UE 120 configuration. Effectively, this implies that, apart from suspend/resume operations related to SCG, no RRC procedure would be applicable to the suspended SCG configuration.

For instance, while having multiple suspended SCGs and one active SCG, when receiving an RRCReconfiguration message to reconfigure the active SCG, this may include the configuration of a radio bearer ID also defined in a suspended SCG. This is possible given that suspended SCGs should not be part of current active UE 120 configuration and thus should not affect or be affected by ongoing procedures for MCG and any active SCG.

Similarly, when switching from one active SCG to another, the target SCG configuration should be entirely applied while the source SCG configuration entirely suspended (or release, depending on network configuration), without any RRC conflict with respect to e.g. UE 120 capabilities and security.

Figure 13A:
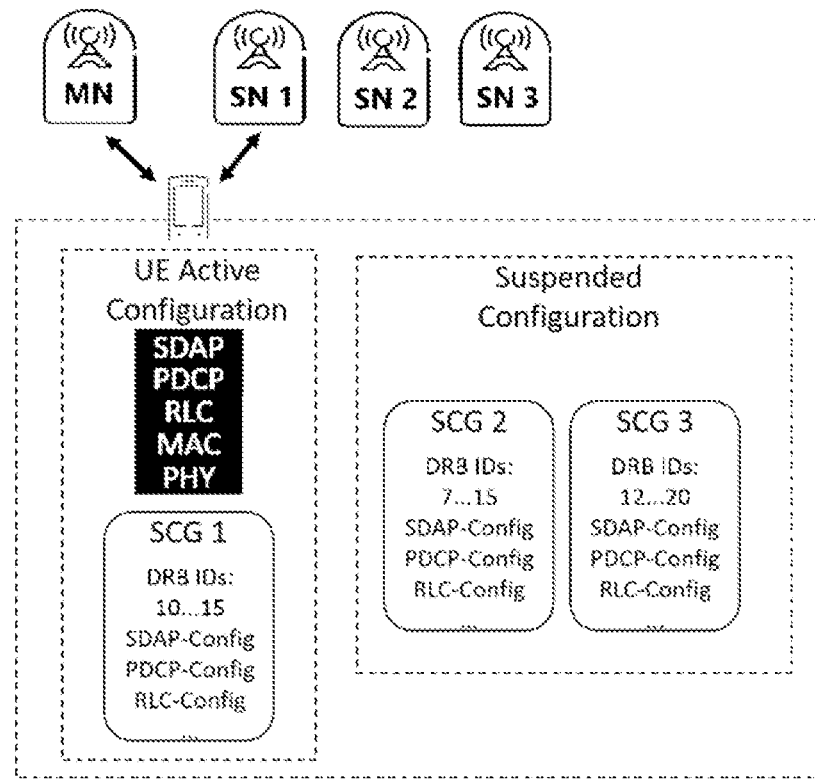
FIG. 13*a-b* are is a schematic block diagrams of embodiments herein.
Figure 13B:
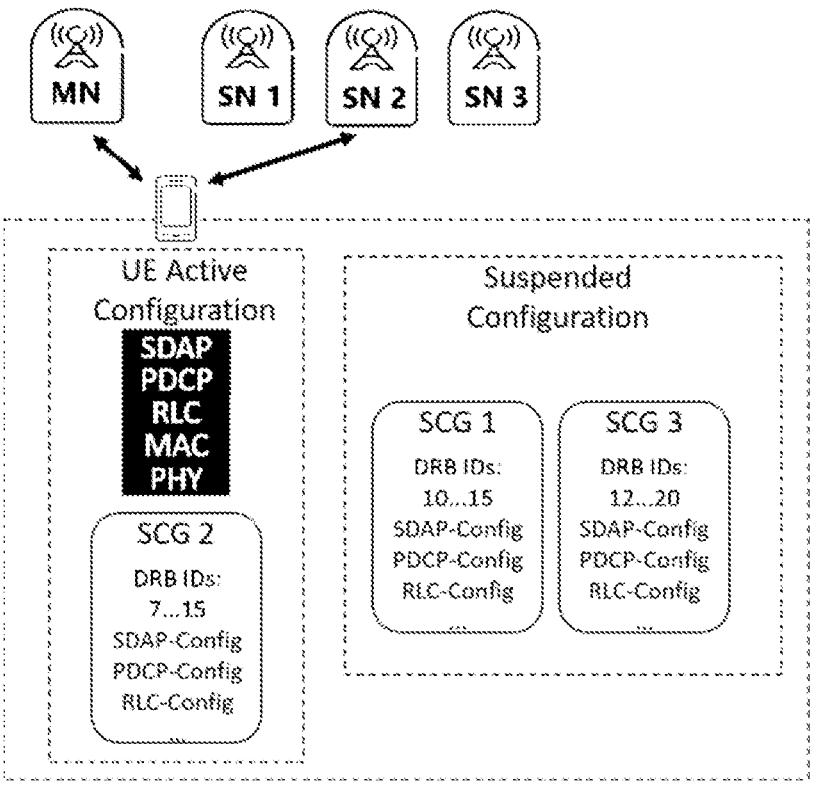

FIGS. 13a and 13b depicts an example of suspended (deactivated) and resumed (active) SCG configurations for user plane of the UE 120 wherein SDAP means Service Data Adaptation Protocol, PDCP means Packet Data Convergence Protocol, RLC means Radio Link Control, MAC means Medium Access Control, PHY means Physical layer, and DRB ID means Data Radio Bearer Identity.

FIG. 13a shows an example scenario wherein the UE 120 is handling multiple SCG configurations comprising: The first SCG configuration referred to as SCG1 provided by the first SN 111 referred to as SN1 in FIGS. 13*a* and 13*b*, the second SCG configuration referred to as SCG2 provided by the second SN 112 referred to as SN2 in FIGS. 13*a* and 13*b*, and further a third SCG configuration referred to as SCG3 provided by a third SN referred to as SN3 in FIGS. 13*a* and 13*b*.

The UE 120 is served by the network node 110, which in this example is referred to as an MN, and the first SN 111, SN1. The SCG1 configuration is active. The SCG2 and SCG3 are in suspended states and these SCG configurations are stored in the UE 120.

FIG. 13*b* shows the example scenario a later stage. In this later stage the UE 120 is still served by the MN and has received an indication from the MN to switch from being served by SN1 to be served by SN2. Thus the UE 120 has switched from being served by the SN1 to be served by SN2. The SCG1 configuration is then suspended and the SCG2 configuration has been activated by the UE 120. The SCG3 is still in a suspended state.

Suspend/Resume Operations for the Multiple SCGs

To achieve suspending/resuming operations for multiple SCG configurations, there may be several embodiments applied as will be discussed below.

MN Initiated Resume/Suspend Request of SCG

In some embodiments, the network node 110 such as the MN decides and initiates the resumption and/or suspension of the SCG configurations. This applies both to UEs such as the UE 120 in RRC_INACTIVE state and RRC_CONNECTED state, where the MN instructs the UE 120 to suspend and/or resume and/or reconfigure specific SCG configurations.

SCG Resume in RRC_CONNECTED

Figure 14:
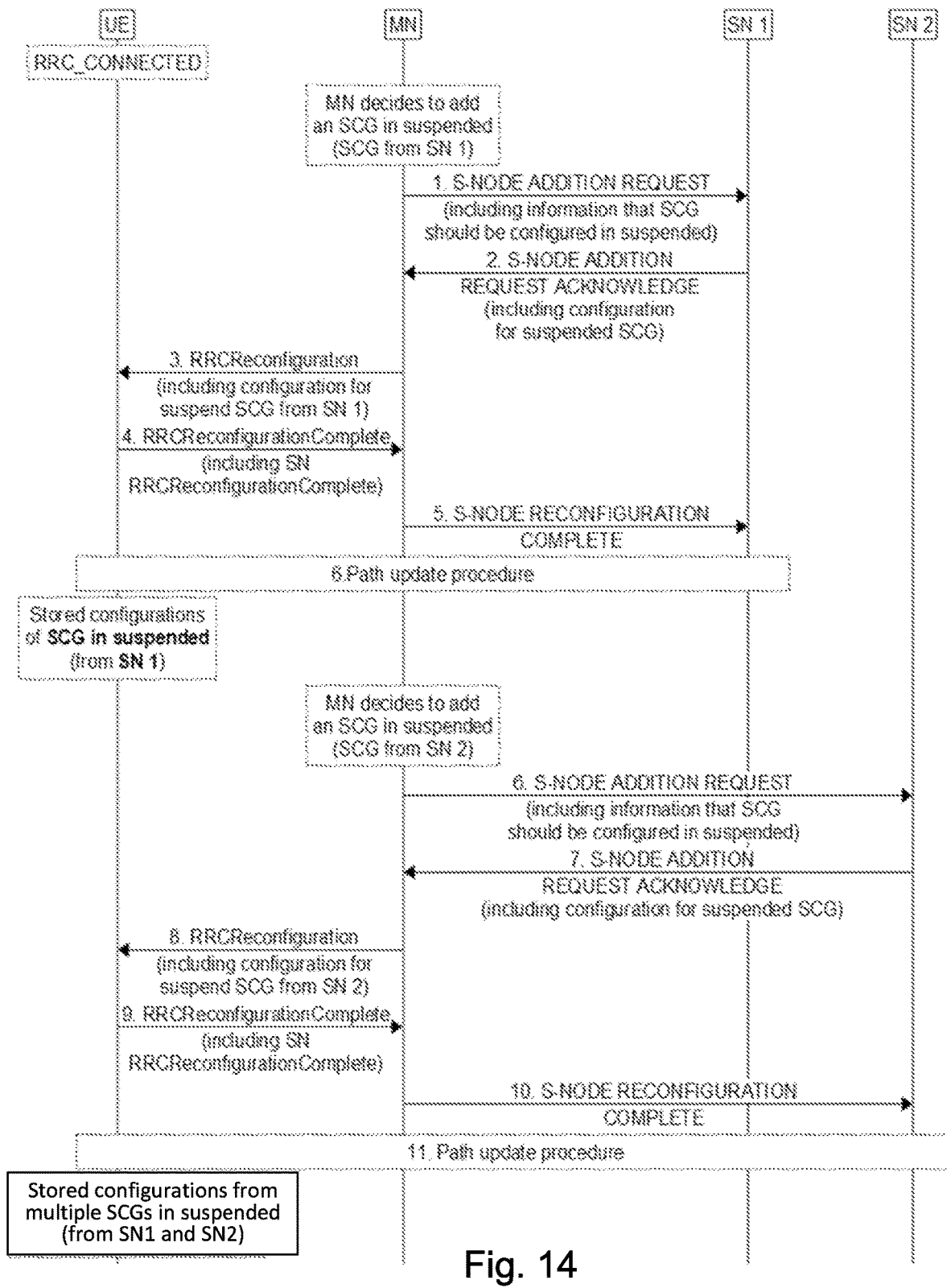
FIG. 14 is a sequence diagram depicting embodiments of a method in a wireless communications network.

FIG. 14 depicts RRC configuration of suspended SCGs in RRC_CONNECTED in steps 1-11. While the UE 120 is in RRC_CONNECTED, the network node 110 here referred to as MN may setup new SCGs in suspended state, see FIG. 14, in case e.g. the MN prepares multiple SNs that may serve the UE 120 and/or multiple SCGs in one or more SNs, so that fast switching, as described above, between their configurations may be performed.

The MN may decide to add an SN1, even if it is not to be activated, and then suspend it. This may be done either in two steps, i.e. add and suspend procedures or a modified SN addition procedure with a flag to add in suspended mode. For the latter case, S-NODE ADDITION REQUEST message to SN1 (Step 1) may be used, with an indication of one or more SCGs to be configured in suspended at the SN.

The SN1 may respond e.g. with an S-NODE ADDITION REQUEST ACKNOWLEDGE message (Step 2), containing a second SCG configurations to be kept in suspended.

The SCG configurations are sent to the UE 120, for instance, via RRCReconfiguration message (Step 3) containing indications whether each and/or any of those configurations should be in suspended or resumed, as described above. The UE 120 stores the received SCG configurations and may respond in a RRCReconfigurationComplete message (Step 4). An S_NODE RECONFIGURATION COMPLETE message (Step 5) is then sent to SN1.

While having multiple SCG configurations, the MN may send an indication of which SCG configuration should be suspended and/or resumed among multiple SCGs (considering that at most one SCG is active at a time). However, in some embodiments, there may be more than two configurations in suspended or resume state even though it may be rather unlikely due to its complexity. The advantage of such solution would be to further increase the availability of the network and reduce latency e.g., for mission-critical applications/use cases.

When the network node 110 such as the MN decides to suspend/resume a certain SCG configuration, it may utilize available network measurements and/or reported UE 120 measurements in different carrier frequencies. Also, any of the following can be taken into account: UE 120 location indication (directly or indirectly), buffer status report, quality of service (QoS) indicators, application information, UE 120 class/category, UE 120 capabilities, such as supported bands/band combinations, number of transmitters/receivers. Furthermore, the MN may indicate whether the active SCG configuration should be released/suspended when another SCG is to be activated. Otherwise, once a new SCG is activated/resumed, the former one(s) could automatically be suspended or released. Here, the "suspended" term may be replaced with the "deactivated" term as the UE 120 is in the connected mode. The more details on the possible network coordination/signalling and RRC signalling are discussed below.

The MN may decide to add an SN2. The MN may request SCG configurations in SNs to be resumed or suspended via e.g. S-NODE MODIFICATION REQUEST message. The MN would then send a message to the target SN, SN2, requesting it to be resumed (Step 6). The message sent from the MN to the SN2 may contain indications for one or more SCGs at the SN2. The SN2 may respond with an S-NODE MODIFICATION REQUEST ACKNOWLEDGE message (Step 7).

The SCG2 configuration is sent to the UE 120, for instance, via RRCReconfiguration message (Step 8) containing indications whether each and/or any of this configurations should be in suspended or resumed, as described above. The UE 120 stores the received SCG configurations and may respond in a RRCReconfigurationComplete message (Step 9). An S_NODE RECONFIGURATION COMPLETE message (Step 5) is then sent to SN2.

If it is desired to have only one resumed SCG configuration at a time, the MN may send a request to the former resumed SN1 to be suspended, RRC suspension of a source SCG, and resumption of a target SCG in RRC_CONNECTED. The suspended SN would typically maintain dedicated resources for the configured UE 120. However, if the network node 110 does not want to keep dedicated resources, it may not store it and apply full configuration when requested to resume the UE 120. This may still have benefits e.g. regarding already performed capability coordination between MN and SN (on SN addition), if the full configuration does not imply in renegotiation of UE 120 capabilities.

Figure 15:
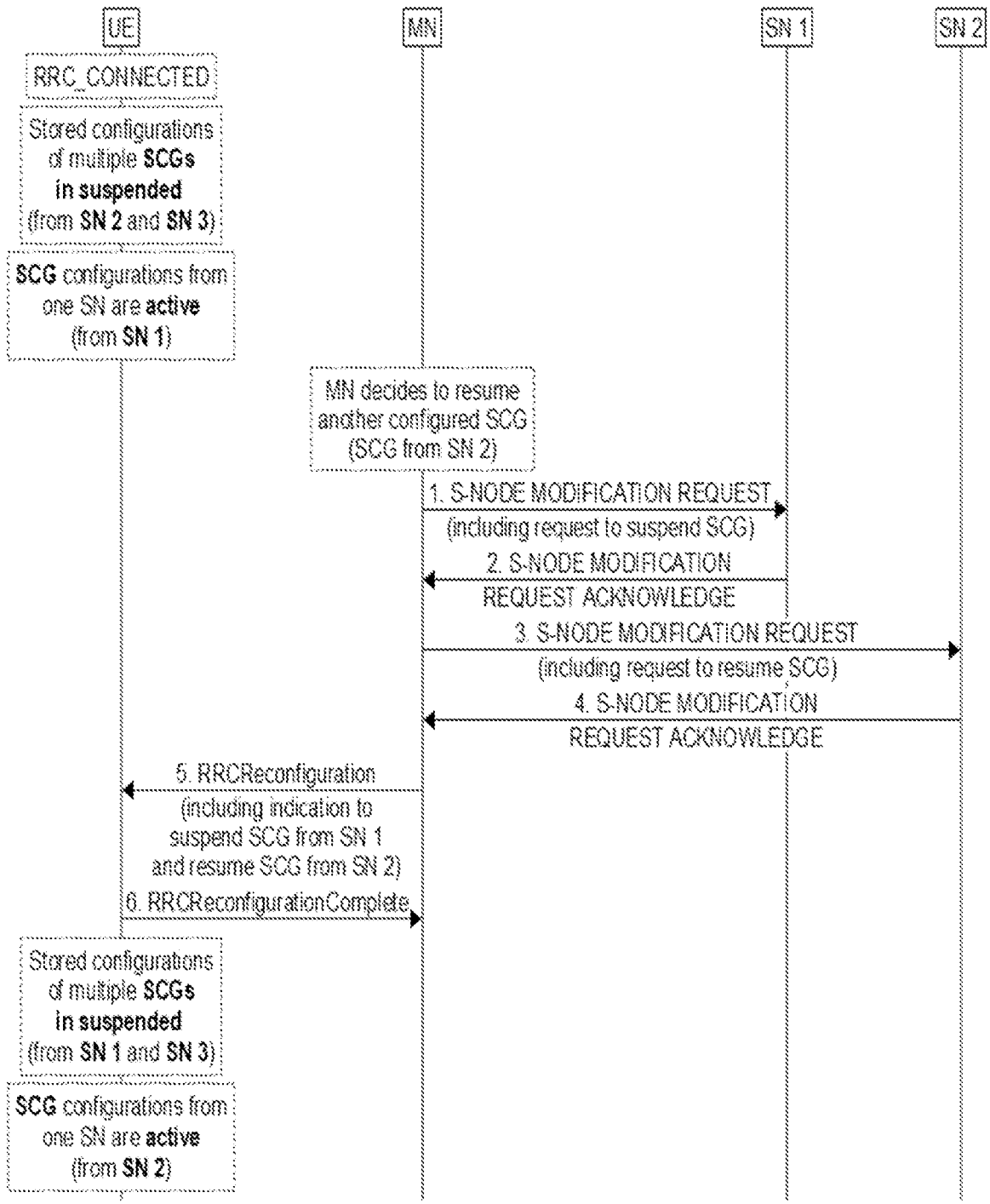
FIG. 15 is a sequence diagram depicting embodiments of a method in a wireless communications network.

FIG. 15 depicts an RRC suspension of a source SCG, and resumption of a target SCG when the UE 120 is in RRC_CONNECTED mode in steps 1-6.

The UE 120 has stored multiple SCG configurations in suspended state from SN2 and SN3.

SCG configurations from SN1 are active.

MN decides to resume another configured SCG from SN2.

The MN sends a S-NODE MODIFICATION REQUEST including request to suspended SCG to SN1 (Step 1).

The SN1 responds in a S-NODE MODIFICATION REQUEST ACKNOWLEDGE to MN (Step 2).

The MN sends a S-NODE MODIFICATION REQUEST including request to resume SCG to SN2 (Step 3).

The SN2 responds in a S-NODE MODIFICATION REQUEST ACKNOWLEDGE to MN (Step 4).

The MN then sends to the UE 120, an RRCConfiguration including indication to suspend SCG from SN 1 and possibly from SN3 (SN3 not shown) and to resume SCG from SN2 (Step 5)

The UE 120 responds to the MN in an RRCConfigurationComplete (Step 6)

The UE then suspends SCG from SN 1 and possibly from SN3 and resumes SCG from SN2.

SCG Resume from RRC INACTIVE

When the UE 120 transitions from RRC_CONNECTED to RRC_INACTIVE, the network node 110 such as MN may send an indication of which SCG configuration(s) i.e., one or more SCG configurations should be suspended and which SCG configuration(s) should be released. It should be noted that this means there may be multiple SCG configurations configured but in suspended state. In some embodiments, SCG suspend indication from network may indicate that all SCG configurations stored by the UE 120 should be suspended. Yet in further embodiments, simply suspend indication (regardless it is for MCG or SCG) from network may indicate that all SCG configurations stored by the UE 120 should be suspended. In further embodiments, the UE 120 can store all the SCG configurations or last X (number) SCG configurations without explicit indication for each. Thus, number may be pre-defined (specified) or configured by the network. The number could be an integer equal to or larger than 0. If the number is 0, then the UE 120 will release all SCG configurations.

Figure 16:
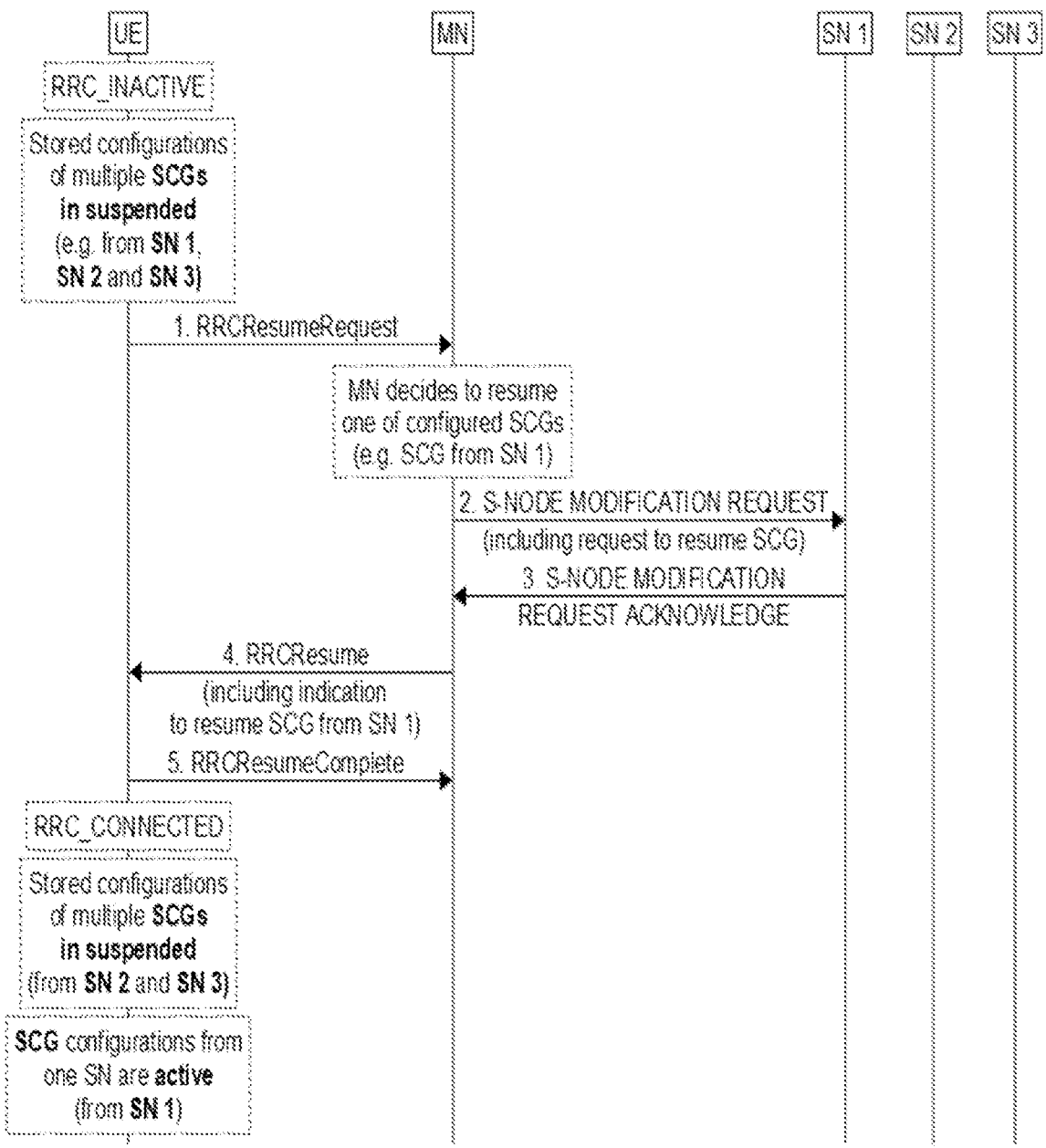
FIG. 16 is a sequence diagram depicting embodiments of a method in a wireless communications network.

FIG. 16 depicts RRC Resume from RRC_INACTIVE while resuming one SCG of multiple suspended SCG configurations. In FIG. 16, the UE 120 has stored SCG configurations from SN1, SN2 and SN3 when in RRC_INACTIVE mode.

The UE 120 will send an RRCResumeRequest message (Step 1) to the MN when the UE 120 transitions from RRC_INACTIVE to RRC_CONNECTED, and the network node 110 such as MN decides that an SCG should be resumed from SN1, the MN may send an indication of which SCG configuration should be resumed (among the stored configurations) to the UE 120

The MN will inform the corresponding SN1 that it should resume the transmission using inter-node messages e.g. S-NODE MODIFICATION REQUEST message (Step 2).

The SN1 will then respond in a S-NODE MODIFICATION REQUEST message (Step 3).

The MN then may include an indication in e.g. RRCResume message (Step 4) to the UE 120, of which SCG configurations should be resumed. More details of how to indicate the SCG configurations to be resumed/suspended are given below. The UE will then respond in RRCResumeComplete message (Step 5) to the UE 120.

SN Initiated Resume/Suspend Request

Although the resume/suspend operations in some embodiments above have a focus on MN initiated operations, they may also be initiated by an SN. In this case, inter-node messages may be applicable.

UE 120 Initiated Resume Request

When requesting to transit from RRC_INACTIVE to RRC_CONNECTED, a UE 120 may also perform a request to resume a specific SCG configuration. It should be noted that UE 120 may also simply send RRC Resume Request and the network such as the network node 110 may decide which SCG to be resumed as discussed in the previous embodiments. Yet in another embodiment the UE 120 may decide whether it sends the resume request for single connectivity or dual/multi connectivity operation. Also, the UE 120 may take into account capabilities, application type etc. when deciding to send a resume request or a type of resume request.

The indication from the UE 120 may be provided in a RRCResumeRequest: A new RRCResumeRequest message is introduced which includes an indication that the SCG should be resumed. The current structure of the RRCResumeRequest is not possible to modify, however, with the introduction of RRCResumeRequest1, which is transmitted on a different logical channel CCCH1, has a larger size, which enables introduction of a new indication, an example for this case described above.

Following a request message to resume the SCG, the MN may reject the request, release the requested SCG, and/or resume another SCG. For instance, in some embodiments, network may decide to release one or more SCG configurations of a certain UE 120 because it may need to use the reserved network resources and/or IDs etc. for the other UEs. In this case, when the UE 120 returns from inactive state, the network may release the SCG configurations or apply full configuration for adding SCG configuration. However, the MN may also accept the request and resume the requested SCG. Thus, it is depicted below the case where the MN accepts to resume the SCG and follows similar procedures as described for MN initiated resumption of a given SCG.

Figure 17:
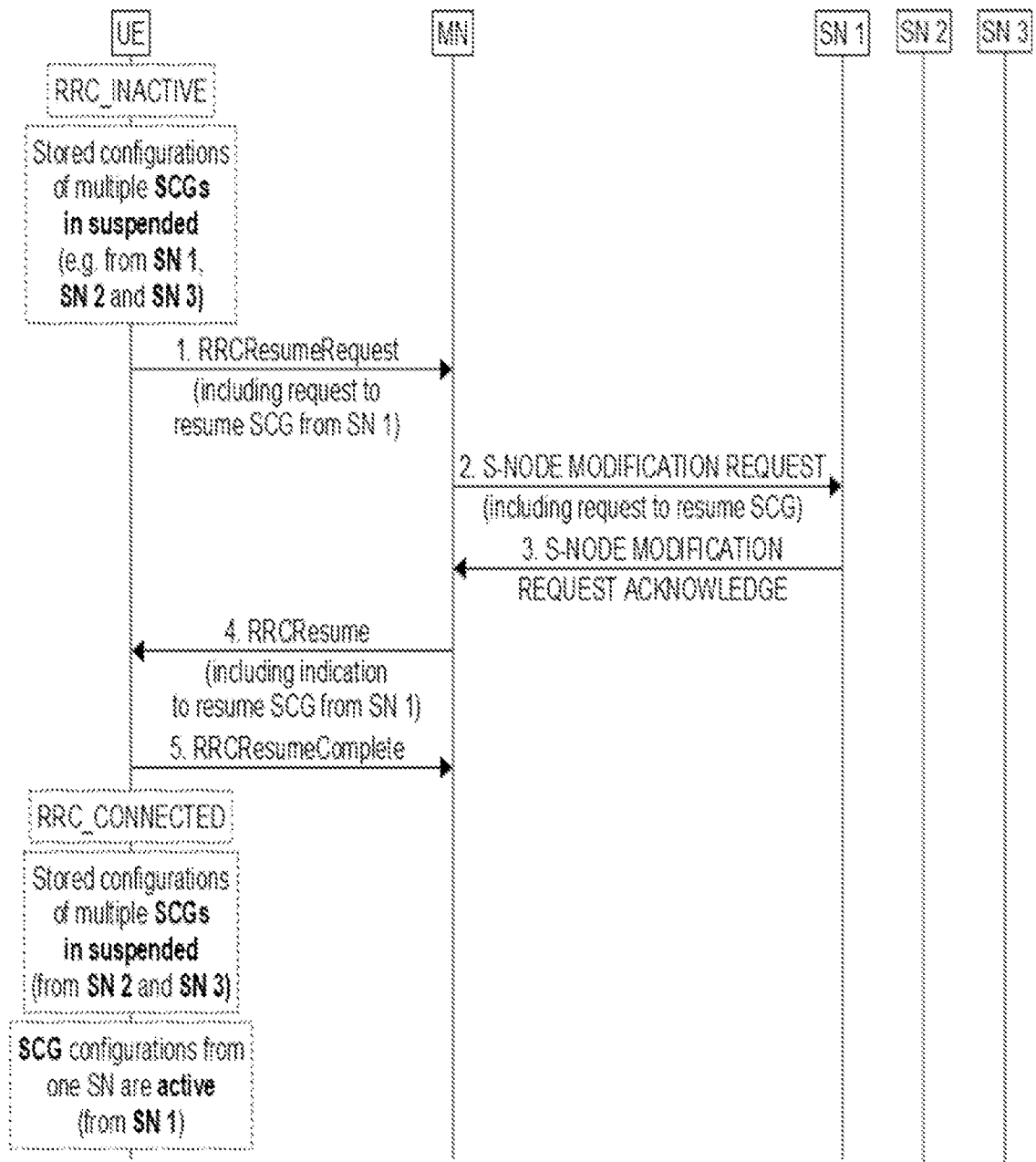
FIG. 17 is a sequence diagram depicting embodiments of a method in a wireless communications network.

The request for a specific SCG configuration may also be performed when the UE 120 is in RRC_CONNECTED, with similar procedures as illustrated in FIG. 17. Since the UE 120 is already in RRC_CONNECTED, the RRC Resume request would not need to be conveyed by SRB0, and thus can be conveyed by SRB1.

In both cases, UE 120 transitioning from RRC_INACTIVE to RRC_CONNECTED, and UE 120 in RRC_CONNECTED, the decision of which SCG should be indicated in a resume request may be taken according to any of the methods described above.

FIG. 17 depicts RRC Resume from RRC_INACTIVE with UE 120 request for a specific SCG configuration to be resumed in steps 1-5. In FIG. 17, the UE 120 has stored SCG configurations from SN1, SN2 and SN3 when in RRC_INACTIVE mode.

The UE 120 will send an RRCResumeRequest message (Step 1) to the MN when the UE 120 transitions from RRC_INACTIVE to RRC_CONNECTED.

The MN will inform the corresponding SN1 that it should resume the transmission using inter-node messages e.g. S-NODE MODIFICATION REQUEST message (Step 2).

The SN1 will then respond in a S-NODE MODIFICATION REQUEST message (Step 3).

The MN then may include an indication in e.g. RRCResume message (Step 4) to the UE 120, of which SCG configurations should be resumed. The UE will then respond in RRCResumeComplete message (Step 5) to the UE 120. Now, the UE 120 has stored SCG configurations in suspended for SN2 and SN3, ant the UE 120 has activated SCG configurations of SN1.

Examples of Modified Messages

To indicate multiple SCG configurations to be resumed/suspended, one implementation may be as shown below for a RRCResume message with changes highlighted as underlined, where the SCG configuration to be resumed/suspended is implicitly indicated by the position of each SCG in a list of containers.

Since the position of SCGs in the list of containers would be used to identify a given SCG, all SCGs should be referred in RRCResume message, the ones to be resumed and the ones to be kept suspended. While he field indicating resume/suspend indication may be called resume, it may also be called suspend or activate. It may be simply 1-bit indicator to express whether the configuration is suspended or resumed. In some embodiments, it may be extended to include further indications/meanings.

Example of RRCResume Message

| RRCResume message |
|---|
| ``` |
| -- ASN1START |
| -- TAG-RRCRESUME-START |
| RRCResume ::=                              SEQUENCE { |
|     rrc-TransactionIdentifier              RRC-TransactionIdentifier, |
|     criticalExtensions                     CHOICE { |
|         rrcResume                          RRCResume-IEs, |
|         criticalExtensionsFuture           SEQUENCE { } |
|     } |
| } |
| RRCResume-IEs ::=                          SEQUENCE { |
|     radioBearerConfig                      RadioBearerConfig |
|         OPTIONAL,          -- Need M |
|     masterCellGroup                        OCTET STRING |
|         (CONTAINING CellGroupConfig) |
|         OPTIONAL,          -- Need M |
|     measConfig                             MeasConfig |
|         OPTIONAL,          -- Need M |
|     fullConfig                             ENUMERATED {true} |
|         OPTIONAL,          -- Need N |
|     lateNonCriticalExtension               OCTET STRING |
|         OPTIONAL, |
|     nonCriticalExtension                   RRCResume-v15xx-IEs |
|         OPTIONAL |
| } |
| RRCResume-v15xx-IEs ::=                    SEQUENCE { |
|     radioBearerConfig2-r15x                OCTET STRING |
|         (CONTAINING RadioBearerConfig) |
|         OPTIONAL,          -- Need M |
|     sk-Counter-r15x                        INTEGER (0..65535) |
|         OPTIONAL,          -- Need N |
|     scg-ToAddModList                       SCG-ToAddModList |
|         OPTIONAL,          -- Need N |
|     scg-ToReleaseList                      SCG-ToReleaseList |
|         OPTIONAL,          -- Need N |
|     nonCriticalExtension                   SEQUENCE{ } |
|         OPTIONAL |
| } |
| SCG-ToAddModList ::=           SEQUENCE (SIZE (1..maxSCG)) OF SCG-ToAddMod |
|         OPTIONAL,          -- Need N |
| SCG-ToReleaseList ::=          SEQUENCE (SIZE (1..maxSCG)) OF SCG-ID |
|         OPTIONAL,          -- Need N |
| SCG-ToAddMod                   ::=   SEQUENCE { |
|     resume          ENUMERATED {true}, |
|     sk-counter      INTEGER (0..65535) |
|         OPTIONAL,      -- Cond S-KeyChangeConfig |
|     mrdc-MultipleSecondaryCellGroup        MRDC-MultipleSecondaryCellGroup |
|         OPTIONAL, -- Need M |
| } |
|     OPTIONAL,          -- Need M |
| MRDC-MultipleSecondaryCellGroup        CHOICE { |
|     nr-SCG                             OCTET STRING, |
|     eutra-SCG                          OCTET STRING |
| } |
|     OPTIONAL,          -- Need M |
| SCG-ID ::= INTEGER(1.. maxSCG) |
| -- TAG-RRCRESUME-STOP |
| -- ASN1STOP |
| ``` |

| Conditional Presence | Explanation |
|---|---|
| S-KeyChangeConfig | In case of NR-DC; this field is mandatory upon PSCell addition (resumed or suspended), and optionally present, Need N upon PSCell change (resumed or suspended). In case of NE-DC, this field is mandatory upon PSCell addition or change (resumed or suspended). Otherwise, the field is absent. |

Instead of identifying SCG configurations by their positions in containers, an ID may be assigned to each SCG, which is similar to the signaling depicted for RRCReconfiguration message described above. In this manner, it is necessary to signal only SCGs to be resumed or, alternatively, the ones to be suspended.

Example of RRCResume Message

```
-- ASN1START
-- TAG-RRCRESUME-START
RRCResume ::=                          SEQUENCE {
    rrc-TransactionIdentifier          RRC-TransactionIdentifier,
    criticalExtensions                 CHOICE {
        rrcResume                      RRCResume-IEs,
        criticalExtensionsFuture       SEQUENCE {}
    }
}
RRCResume-IEs ::=                      SEQUENCE {
    radioBearerConfig                  RadioBearerConfig
    OPTIONAL,           -- Need M
    masterCellGroup                    OCTET STRING
    (CONTAINING CellGroupConfig)
    OPTIONAL,           -- Need M
    measConfig                         MeasConfig
    OPTIONAL,           -- Need M
    fullConfig                         ENUMERATED {true}
    OPTIONAL,           -- Need N
    lateNonCriticalExtension           OCTET STRING
    OPTIONAL,
    nonCriticalExtension               RRCResume-v15xx-IEs
    OPTIONAL
}
RRCResume-v15xx-IEs ::=                SEQUENCE {
    radioBearerConfig2-r15x            OCTET STRING
    (CONTAINING RadioBearerConfig)
    OPTIONAL,           -- Need M
    sk-Counter-r15x                    INTEGER (0..65535)
    OPTIONAL,           -- Need N
    scg-ToAddModList                   SCG-ToAddModList
    OPTIONAL,           -- Need N
    scg-ToReleaseList                  SCG-ToReleaseList
    OPTIONAL,           -- Need N
    nonCriticalExtension               SEQUENCE{}
    OPTIONAL
}
SCG-ToAddModList ::=                   SEQUENCE (SIZE
(1..maxSCG)) OF SCG-ToAddMod
    OPTIONAL,       -- Need N
SCG-ToReleaseList ::=                  SEQUENCE (SIZE
(1..maxSCG)) OF SCG-ID
    OPTIONAL,       -- Need N
SCG-ToAddMod ::=                       SEQUENCE {
    scg-ID                             SCG-ID,
    resume                             ENUMERATED {true}
    OPTIONAL,
    sk-counter                         INTEGER (0..65535)
    OPTIONAL,       -- Cond S-KeyChangeConfig
    mrdc-MultipleSecondaryCellGroup    MRDC-MultipleSecondaryCellGroup
    OPTIONAL,       -- Need M
}
OPTIONAL,       -- Need M
MRDC-MultipleSecondaryCellGroup        CHOICE {
    nr-SCG                             OCTET STRING,
    eutra-SCG                          OCTET STRING
}
OPTIONAL       -- Need M
SCG-ID ::= INTEGER(1.. maxSCG)
-- TAG-RRCRECONFIGURATION-STOP
-- ASN1STOP
-- TAG-RRCRESUME-STOP
-- ASN1STOP
```

In another embodiment, the field name for the container may identify the SCG configuration that is to be resumed or suspended.

Example of RRCResume Message

```
-- ASN1START
-- TAG-RRCRESUME-START
RRCResume ::=                          SEQUENCE {
    rrc-TransactionIdentifier          RRC-TransactionIdentifier,
    criticalExtensions                 CHOICE {
        rrcResume                      RRCResume-IEs,
        criticalExtensionsFuture       SEQUENCE { }
    }
}
RRCResume-IEs ::=                      SEQUENCE {
    radioBearerConfig                  RadioBearerConfig
    OPTIONAL,           -- Need M
    masterCellGroup                    OCTET STRING
    (CONTAINING CellGroupConfig)
    OPTIONAL,           -- Need M
    measConfig                         MeasConfig
    OPTIONAL,           -- Need M
    fullConfig                         ENUMERATED {true}
    OPTIONAL,           -- Need N
    lateNonCriticalExtension           OCTET STRING
    OPTIONAL,
    nonCriticalExtension               RRCResume-v15xx-IEs
    OPTIONAL
}
RRCResume-v15xx-IEs ::=                SEQUENCE {
    radioBearerConfig2-r15x            OCTET STRING
    (CONTAINING RadioBearerConfig)
```

-continued

```
OPTIONAL,               -- Need M
    sk-Counter-r15x                         INTEGER (0..65535)
OPTIONAL,               -- Cond S-KeyChangeConfig
    mrdc-SecondaryCellGroup       CHOICE {
            nr-SCG   OCTET STRING,
            eutra-SCG   OCTET STRING
    }
OPTIONAL,    -- Need M
suspendSCG              ENUMERATED {true}
OPTIONAL,    -- Need N
mrdc-SecondaryCellGroup2      CHOICE {
            nr-SCG   OCTET STRING,
            eutra-SCG   OCTET STRING
            sk-counter       INTEGER (0..65535) OPTIONAL,
-- Cond S-KeyChangeConfig
            suspendSCG2      ENUMERATED
{true}
OPTIONAL,    -- Need N
    }
OPTIONAL,    -- Need M
    nonCriticalExtension              SEQUENCE{ }
OPTIONAL
}
-- TAG-RRCRESUME-STOP
-- ASN1STOP
```

Activation/Deactivation of Multiple SCGs

Although the UE 120 behaviour and message names are described with respect to suspend/resume operations, embodiments herein do not need to be tightly related to it, since irrespective of whether SCG is suspended or not, the RRC state of the UE 120 would be defined by having the MCG configurations suspended or not. Therefore, the embodiments herein may also be formulated as activate/deactivate operations for multiple SCGs, that may be combined with either resume/suspend operations or RRCReconfiguration message.

To perform the method actions above, the UE 120 configured to handle multiple Secondary Cell Group, SCG, configurations in a wireless communications network 100. The UE 120 may comprise an arrangement depicted in FIGS. 18*a* and 18*b*.

The UE 120 may comprise an input and output interface 1800 configured to communicate with network nodes such as the network node 110, the first SN 111 and the second SN 112. The input and output interface 1800 may comprise a wireless receiver (not shown) and a wireless transmitter (not shown).

The UE 120 may further be configured to, e.g. by means of a receiving unit 1810 in the UE 120, receive from a network node 110:
- a first SCG configuration of the first SN 111, and an indication of whether or not the first SCG is to be configured as active or inactive, and
- a second SCG configuration of the second SN 112, and an indication of whether or not the second SCG is to be configured as active or inactive.

The multiple SCG configurations are adapted to comprises at least the first SCG configuration and the second SCG configuration.

The UE 120 may further be configured to, e.g. by means of a deciding unit 1820 in the UE 120, decide whether to handle each respective SCG configuration out of the multiple SCG configurations according to a first option or a second option based on its respective indication.

The first option is adapted to comprise: when one or more out of the respective multiple SCG configurations are indicated to be configured as inactive, the UE 120 is configured to e.g. by means of a storing unit 1830 in the UE 120, store that particular SCG configuration, and the second option is adapted to comprise: when one or more out of the respective multiple SCG configurations are indicated to be configured as active, the UE 120 is configured to, e.g. by means of a activating unit 1840 in the UE 120, activate that particular SCG configuration in the UE 120.

According to the first example Scenario, each of the respective first SCG configuration and second SCG configuration are adapted to be inactive and stored in the UE 120. In this scenario, the UE 120 may further be configured to, e.g. by means of an applying unit 1850 in the UE 120, any one or more out of:

When receiving from the network node 110, an indication to be served by the first SN 111, apply the first SCG configuration stored in the UE (120), and when receiving from the network node (110) an indication to be served by the second SN (112), apply the second SCG configuration stored in the UE (120).

According to the second example Scenario, the first SCG configuration is active and the UE 120 is adapted to be served by the first SN 111. Further, the second SCG configuration is adapted to be inactive and stored in the UE 120. In this scenario, the UE 120 may further be configured to e.g. by means of the activating unit 1840 in the UE 120, when receiving from the network node 110 an indication to switch from being served by the first SN 111 to be served by the second SN 112, activate the second SCG configuration stored in the UE 120.

In this scenario, the UE 120 may further be configured to any one out of: Deactivate the first SCG configuration and storing it in the UE 120, keep the first SCG configuration active, and modify the first SCG configuration active.

According to a third example Scenario, the second SCG configuration is adapted to be active and the UE 120 is served by the second SN 112. Further, the first SCG configuration is adapted to be inactive and stored in the UE 120. In this scenario, the UE 120 may further be configured to e.g. by means of the activating unit 1840 in the UE 120, when receiving from the network node 110 an indication to switch from being served by the second SN 112 to be served by the first SN 111, activate the first SCG configuration stored in the UE 120.

In this scenario, the UE 120 may further be configured to any one out of: In this scenario, the UE 120 may further be configured to any one out of: deactivate the second SCG configuration and store it in the UE 120, keep the second SCG configuration active, and modify the second SCG configuration active.

Figure 18A:
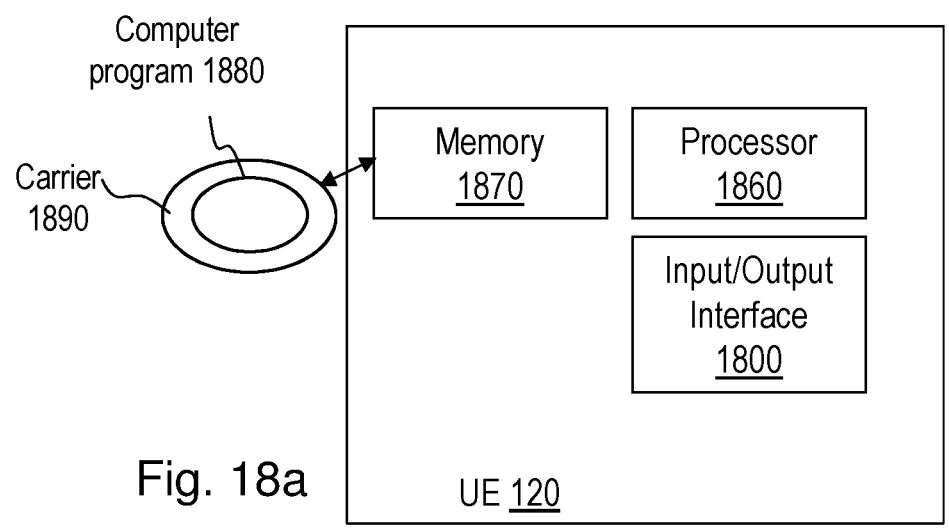
FIG. 18*a-b* are schematic block diagrams illustrating embodiments of a UE.
Figure 18B:
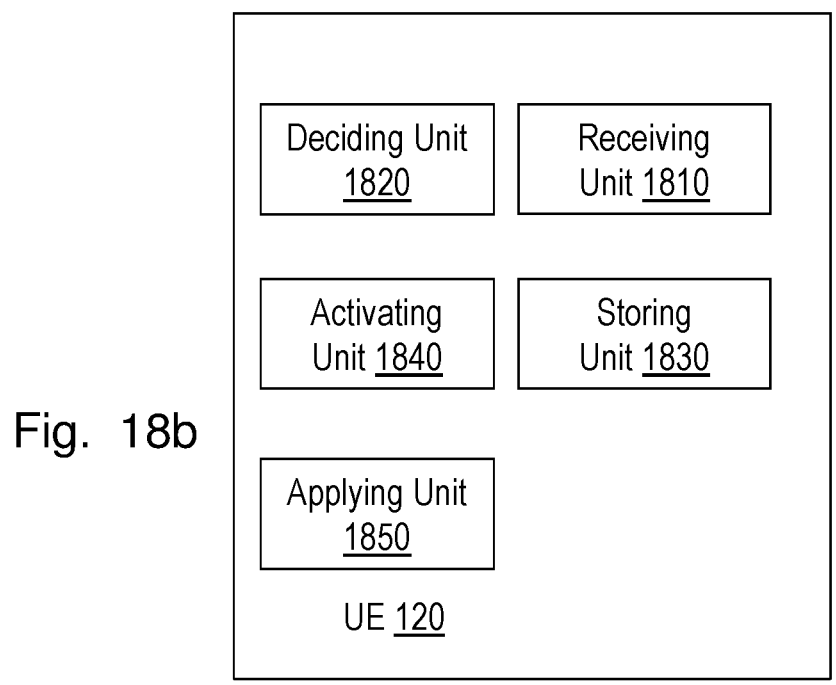

The embodiments herein may be implemented through a respective processor or one or more processors, such as the processor 1860 of a processing circuitry in the UE 120 depicted in FIG. 18*a*, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 1870 comprising one or more memory units. The memory 1870 comprises instructions executable by the processor in UE 120. The memory 1870 is arranged to be used to store e.g. information, indications, data, configurations, and applications to perform the methods herein when being executed in the UE 120.

In some embodiments, a computer program 1880 comprises instructions, which when executed by the respective at least one processor 1860, cause the at least one processor of the UE 120 to perform the actions above.

In some embodiments, a respective carrier 1890 comprises the respective computer program 1880, wherein the carrier 1890 is one of an electronic signal, an optical signal, an electromagnetic signal, a magnetic signal, an electric signal, a radio signal, a microwave signal, or a computer-readable storage medium.

Those skilled in the art will appreciate that the units in the UE 120 described above may refer to a combination of analog and digital circuits, and/or one or more processors configured with software and/or firmware, e.g. stored in the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 19:
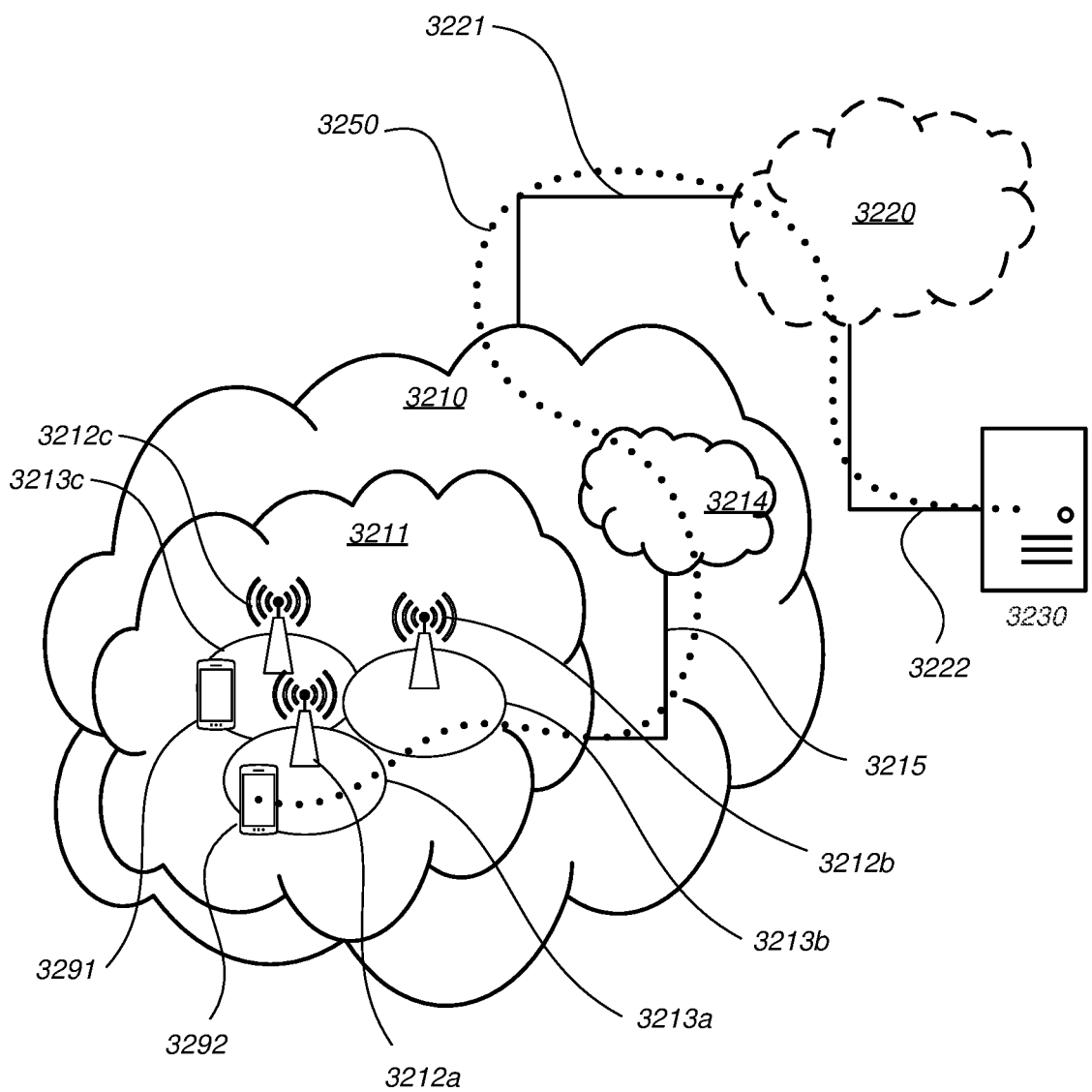
FIG. 19 schematically illustrates a telecommunication network connected via an intermediate network to a host computer.

With reference to FIG. 19, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 19 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 20. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 20) served by the base station 3320. The communication interface 3326 may be configured to facilitate a connection 3360 to the host computer 3310. The connection 3360 may be direct or it may pass through a core network (not shown in FIG. 20) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 20 may be identical to the host computer 3230, one of the base stations 3212a, 3212b, 3212c and one of the UEs 3291, 3292 of FIG. 19, respectively. This is to say, the inner workings of these entities may be as shown in FIG. 20 and independently, the surrounding network topology may be that of FIG. 19.

Figure 20:
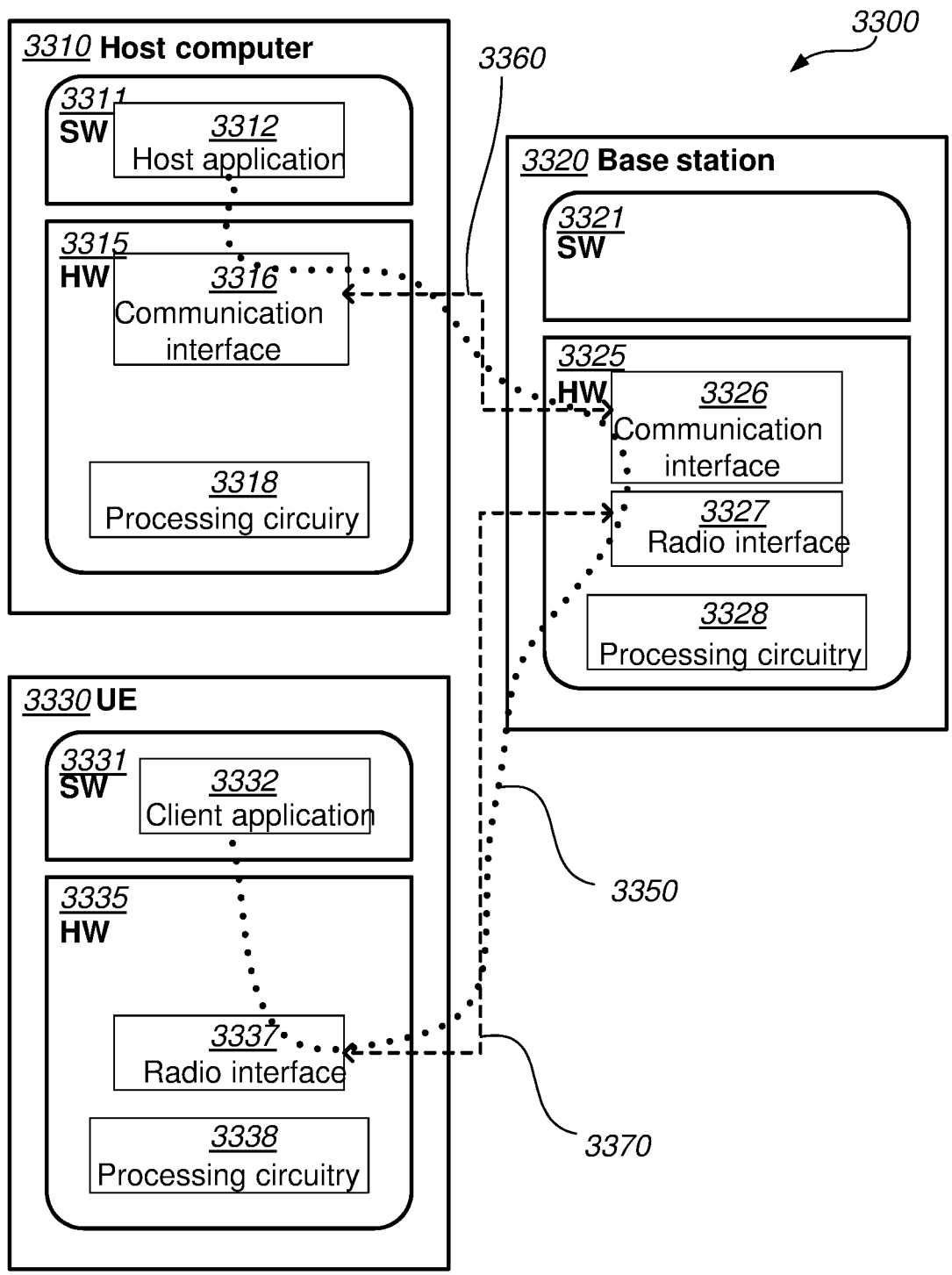
FIG. 20 is a generalized block diagram of a host computer communicating via a base station with a user equipment over a partially wireless connection.

In FIG. 20, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 21 is a flowchart illustrating a method implemented in a communication system, in accordance with one embodiment. The communication system includes a host computer, a base station such as a AP STA, and a UE such as a Non-AP STA which may be those described with reference to FIG. 19 and FIG. 20. For simplicity of the present disclosure, only drawing references to FIG. 21 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 22 is a flowchart illustrating a method implemented in a communication system, in accordance with one embodiment. The communication system includes a host computer, a base station such as a AP STA, and a UE such as a Non-AP STA which may be those described with reference to FIG. 19 and FIG. 20. For simplicity of the present disclosure, only drawing references to FIG. 22 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 23:
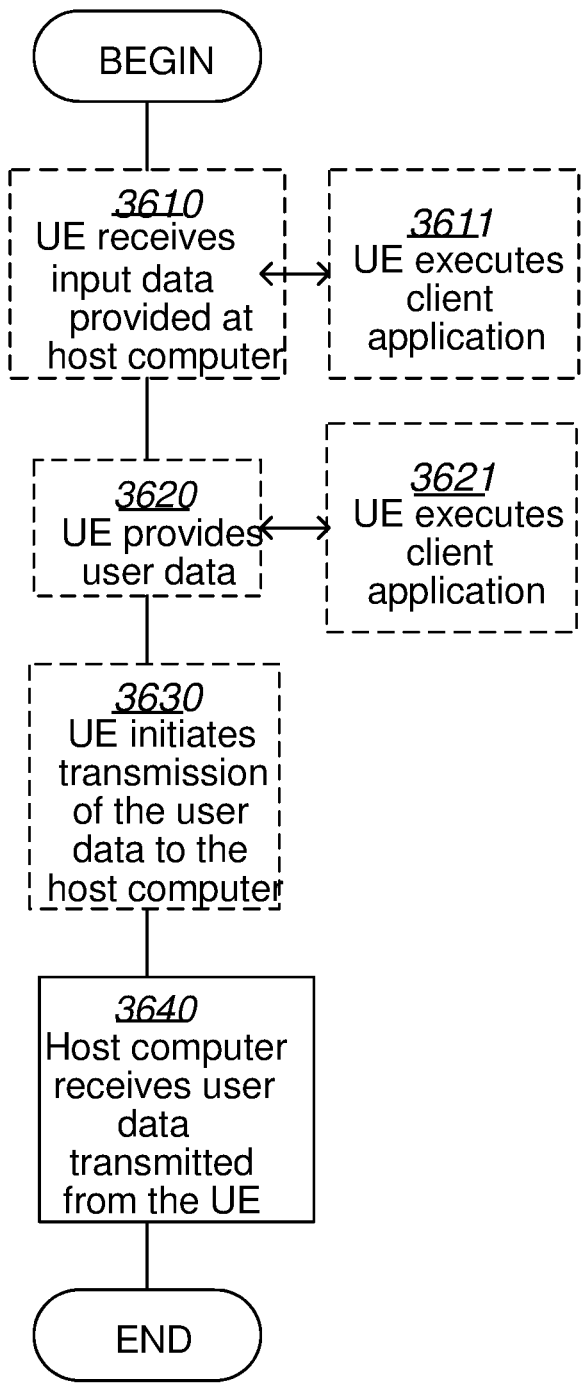

FIG. 23 is a flowchart illustrating a method implemented in a communication system, in accordance with one embodiment. The communication system includes a host computer, a base station such as a AP STA, and a UE such as a Non-AP STA which may be those described with reference to FIG. 19 and FIG. 20. For simplicity of the present disclosure, only drawing references to FIG. 23 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 24:
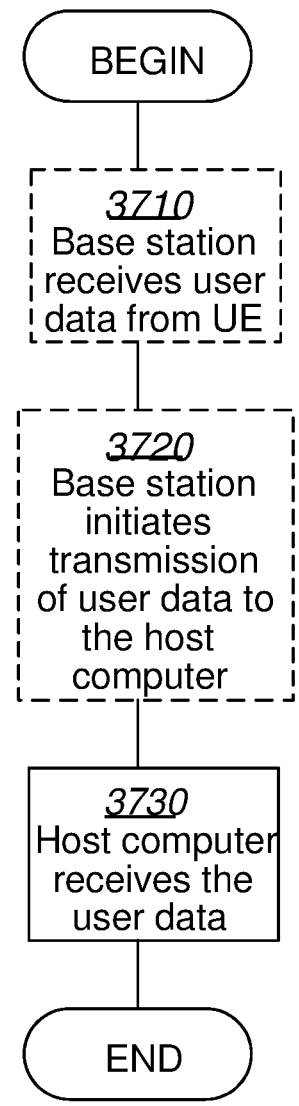

FIG. 24 is a flowchart illustrating a method implemented in a communication system, in accordance with one embodiment. The communication system includes a host computer, a base station such as a AP STA, and a UE such as a Non-AP STA which may be those described with reference to FIG. 19 and FIG. 20. For simplicity of the present disclosure, only drawing references to FIG. 24 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

| Abbreviation | Explanation |
|---|---|
| DC | Dual Connectivity |
| EN-DC | E-UTRA NR Dual Connectivity |
| LTE | Long Term Evolution |
| MN | Master Node |
| MR-DC | Multi-Radio Dual Connectivity |
| NR | New Radio |
| RRC | Radio Resource Control |
| SN | Secondary Node |
| UE | User Equipment |

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a User Equipment (UE) for handling multiple Secondary Cell Group (SCG) configurations in a wireless communications network, the method comprising:
   receiving from a network node at least:
      a first SCG configuration of a first Secondary Node (SN),
      a first indication of whether the first SCG configuration is to be configured as active or inactive,
      a second SCG configuration of a second SN, and
      a second indication of whether the second SCG configuration is to be configured as active or inactive; and
   deciding whether to handle the received SCG configurations according to a first option or a second option, wherein:
      deciding for the first SCG configuration is based on the first indication,
      deciding for the second SCG configuration is based on the second indication,
      the first option comprises: storing a received SCG configuration that is indicated to be configured as inactive; and
      the second option comprises: activating, in the UE, a received SCG configuration that is indicated to be configured as active.

2. The method according to claim 1, wherein when the first SCG configuration and second SCG configuration are inactive and stored in the UE, the method further comprises any one or more of the following:
   when receiving from the network node an indication to be served by the first SN, applying the first SCG configuration stored in the UE, and
   when receiving from the network node an indication to be served by the second SN, applying the second SCG configuration stored in the UE.

3. The method according to claim 1, wherein when the first SCG configuration is active and the UE is served by the first SN and the second SCG configuration is inactive and stored in the UE, the method further comprises:
   when receiving from the network node an indication to switch from being served by the first SN to be served by the second SN, activating the second SCG configuration stored in the UE.

4. The method according to claim 3, further comprising any one out of:
   deactivating the first SCG configuration and storing it in the UE,
   keeping the first SCG configuration active, and
   modifying the first SCG configuration active.

5. The method according to claim 1, wherein when the second SCG configuration is active and the UE is served by the second SN and the first SCG configuration is inactive and stored in the UE, the method further comprises:

when receiving from the network node an indication to switch from being served by the second SN to be served by the first SN, activating the first SCG configuration stored in the UE.

6. The method according to claim 5, further comprising any one of the following:
deactivating the second SCG configuration and storing it in the UE,
keeping the second SCG configuration active, and
modifying the second SCG configuration active.

7. A non-transitory, computer-readable medium storing computer-executable instructions that, when executed by a processor comprising a user equipment (UE), configure the UE to perform operations corresponding to the method of claim 1.

8. A User Equipment (UE) configured to handle multiple Secondary Cell Group (SCG) configurations in a wireless communications network, the UE comprising:
a processor; and
a memory storing computer-executable instructions that, when executed by the processor, configure the UE to:
receive from a network node at least:
a first indication of whether the first SCG configuration is to be configured as active or inactive,
a second SCG configuration of a second SN, and
a second indication of whether the second SCG configuration is to be configured as active or inactive; and
decide whether to handle the received SCG configurations according to a first option or a second option, wherein:
deciding for the first SCG configuration is based on the first indication,
deciding for the second SCG configuration is based on the second indication,
the first option comprises: storing a received SCG configuration that is indicated to be configured as inactive; and
the second option comprises: activating, in the UE, a received SCG configuration that is indicated to be configured as active.

9. The UE according to claim 8, wherein when the first SCG configuration and second SCG configuration are indicated as inactive and stored in the UE, execution of the instructions further configures the UE to perform one or more of the following:
when receiving from the network node an indication to be served by the first SN, apply the first SCG configuration stored in the UE, and
when receiving from the network node an indication to be served by the second SN, apply the second SCG configuration stored in the UE.

10. The UE according to claim 8, wherein when the first SCG configuration is active and the UE is adapted to be served by the first SN, and the second SCG configuration is adapted to be inactive and stored in the UE, execution of the instructions further configures the UE to:
when receiving from the network node an indication to switch from being served by the first SN to be served by the second SN, activate the second SCG configuration stored in the UE.

11. The UE according to claim 10, wherein execution of the instructions further configures the UE to perform any one of the following:
deactivate the first SCG configuration and storing it in the UE,
keep the first SCG configuration active, and
modify the first SCG configuration active.

12. The UE according to claim 8, wherein when the second SCG configuration is adapted to be active and the UE is served by the second SN, and the first SCG configuration is adapted to be inactive and stored in the UE, execution of the instructions further configures the UE to, when receiving from the network node an indication to switch from being served by the second SN to be served by the first SN, activate the first SCG configuration stored in the UE.

13. The UE according to claim 12, wherein execution of the instructions further configures the UE to perform one of the following:
deactivate the second SCG configuration and store it in the UE,
keep the second SCG configuration active, and
modify the second SCG configuration active.

* * * * *

UNITED STATES PATENT AND TRADEMARK OFFICE
CERTIFICATE OF CORRECTION

PATENT NO. : 10,939,366 B2  
APPLICATION NO. : 16/338581  
DATED : March 2, 2021  
INVENTOR(S) : Yilmaz et al.

Page 1 of 1

It is certified that error appears in the above-identified patent and that said Letters Patent is hereby corrected as shown below:

In the Drawings

In Fig. 12d, Sheet 13 of 23, delete " 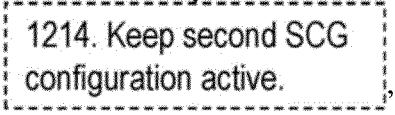 " and insert -- 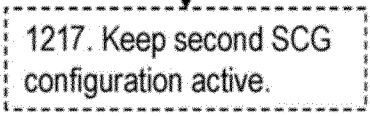 --, therefor.

In the Specification

In Column 2, Lines 31-32, delete "RRC-IDLE or RRC-INACTIVE" and insert -- RRC_IDLE or RRC_INACTIVE --, therefor.

In Column 5, Line 37, delete "RRC_CONNECTED;" and insert -- RRC_CONNECTED. --, therefor.

In Column 16, Line 23, delete "are is a" and insert -- are --, therefor.

In Column 16, Line 32, delete "are is a" and insert -- are --, therefor.

In Column 19, Line 39, delete "a.".

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*